(12) United States Patent
Wallace

(10) Patent No.: US 10,840,487 B2
(45) Date of Patent: Nov. 17, 2020

(54) SYSTEM, METHOD, AND APPARATUS FOR BATTERY CELL-STACK COMPRESSION

(71) Applicant: Facebook, Inc., Menlo Park, CA (US)

(72) Inventor: Jason Wallace, Manassas, VA (US)

(73) Assignee: FACEBOOK, INC., Menlo Park, CA (US)

( * ) Notice: Subject to any disclaimer, the term of this patent is extended or adjusted under 35 U.S.C. 154(b) by 128 days.

(21) Appl. No.: 15/822,700

(22) Filed: Nov. 27, 2017

(65) Prior Publication Data

US 2019/0165346 A1 May 30, 2019

(51) Int. Cl.
| | |
|---|---|
| *H01M 2/10* | (2006.01) |
| *H02S 40/38* | (2014.01) |
| *B64D 27/00* | (2006.01) |
| *H02S 20/30* | (2014.01) |

(52) U.S. Cl.
CPC .......... *H01M 2/1083* (2013.01); *B64D 27/00* (2013.01); *H01M 2/1077* (2013.01); *H02S 20/30* (2014.12); *H02S 40/38* (2014.12); *H01M 2220/20* (2013.01)

(58) Field of Classification Search
CPC ............. H01M 2/1077; H01M 2/1083; H01M 2220/20; H02S 40/38; H02S 20/30; B64D 27/00
See application file for complete search history.

(56) References Cited

U.S. PATENT DOCUMENTS

| | | | |
|---|---|---|---|
| 3,840,009 A | 10/1974 | Michaels et al. | |
| 5,105,088 A * | 4/1992 | Boniface | G01T 1/12 250/472.1 |
| 5,670,272 A | 9/1997 | Cheu et al. | |
| 5,876,872 A * | 3/1999 | Feezor | H01M 2/1094 429/118 |
| 6,040,085 A | 3/2000 | Cheu et al. | |
| 6,174,595 B1 | 1/2001 | Sanders | |
| 8,507,125 B2 | 8/2013 | Meschter | |
| 9,054,361 B2 | 6/2015 | Christian et al. | |
| 9,478,836 B2 | 10/2016 | Albertus et al. | |
| 9,531,039 B2 | 12/2016 | Heubner et al. | |
| 9,705,156 B2 * | 7/2017 | Dorsch | H01M 2/105 |
| 2005/0008908 A1 * | 1/2005 | Kaye | F17C 3/00 429/410 |
| 2008/0213659 A1 | 9/2008 | Yamada | |
| 2010/0216016 A1 | 8/2010 | Seino et al. | |
| 2011/0014501 A1 * | 1/2011 | Scheucher | B60K 1/04 429/7 |
| 2012/0103714 A1 | 5/2012 | Choi et al. | |
| 2013/0330577 A1 | 12/2013 | Kristofek et al. | |
| 2014/0186663 A1 * | 7/2014 | Hiroki | H01M 10/52 429/57 |

(Continued)

*Primary Examiner* — Mayla Gonzalez Ramos
(74) *Attorney, Agent, or Firm* — Keller Jolley Preece

(57) ABSTRACT

The present disclosure relates to the manufacture of battery packs/assemblies and more specifically, the manufacture of battery packs/assemblies for use in aircraft. A lightweight battery assembly with cell compression and/or pressure management system is disclosed herein. The cell compression and/or pressure management system can employ a sealed container housing a volatile vapor. The sealed container can be positioned within the battery enclosure and configured to impart a force to compress the cell-stack.

18 Claims, 13 Drawing Sheets

(56) References Cited

U.S. PATENT DOCUMENTS

2015/0048783 A1  2/2015  Albertus et al.
2015/0236315 A1  8/2015  Hofer et al.
2017/0331323 A1  5/2017  Ehrmantraut et al.

* cited by examiner

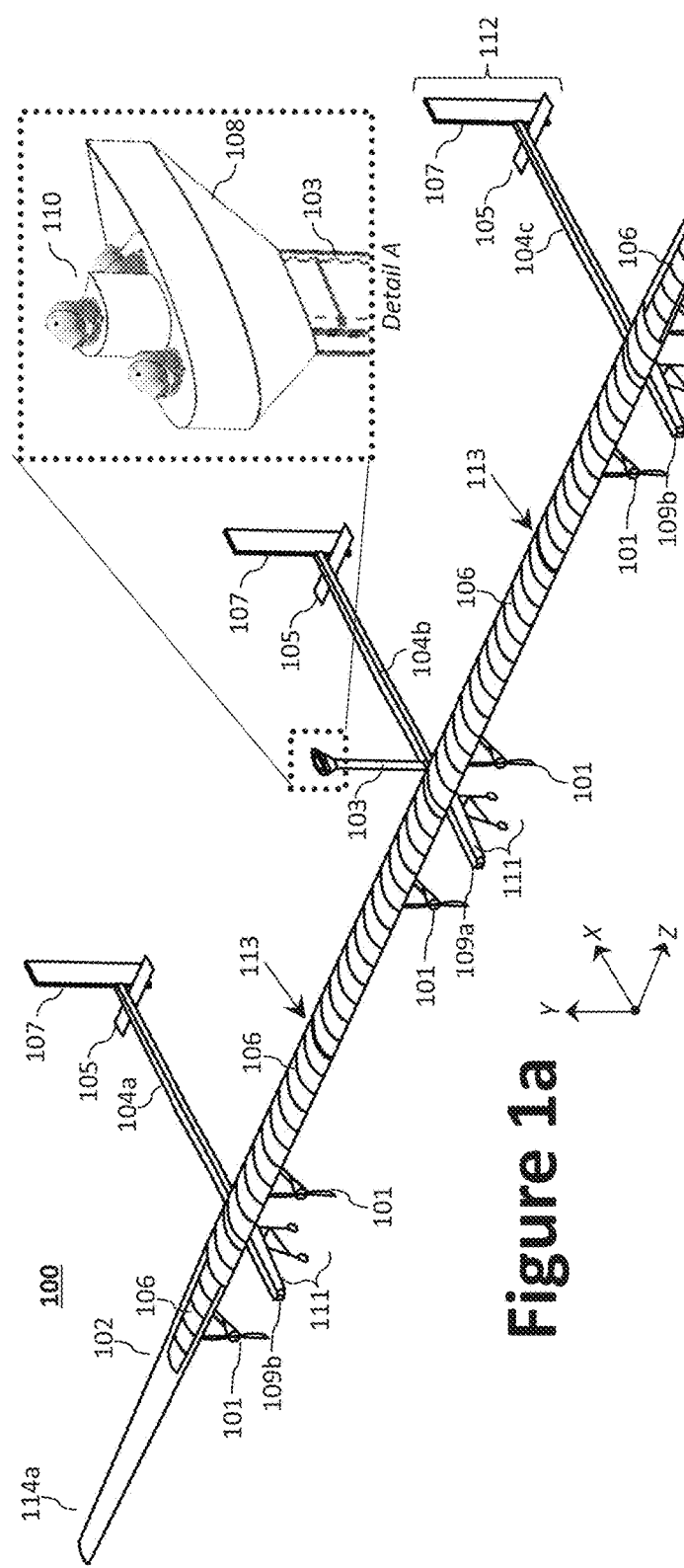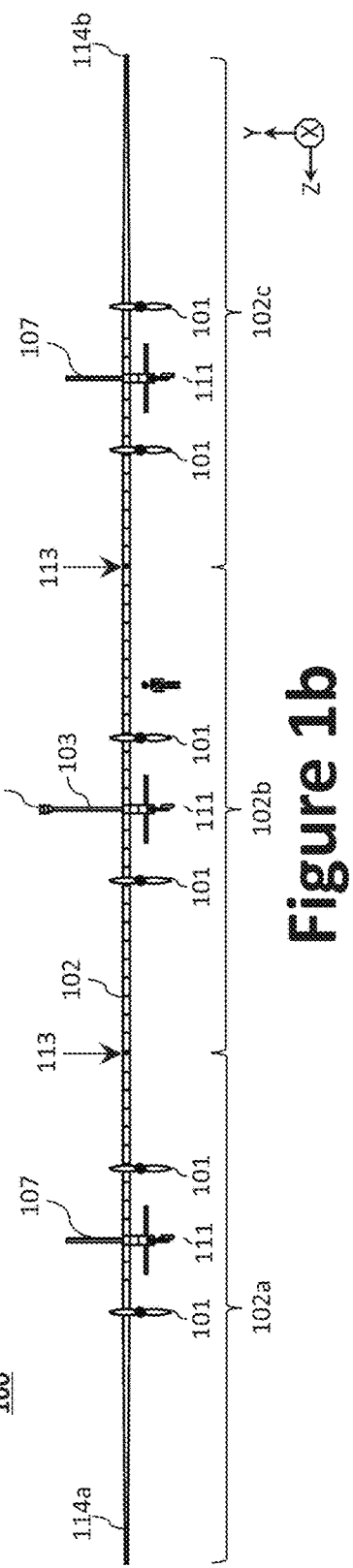

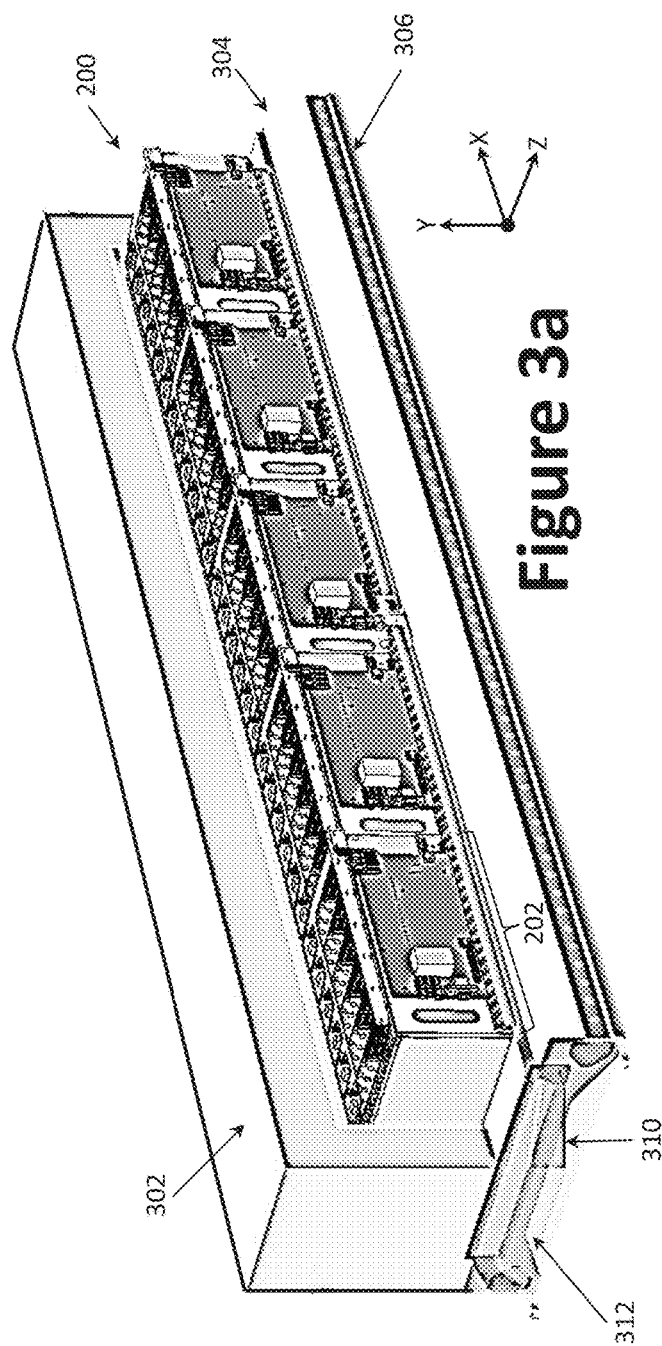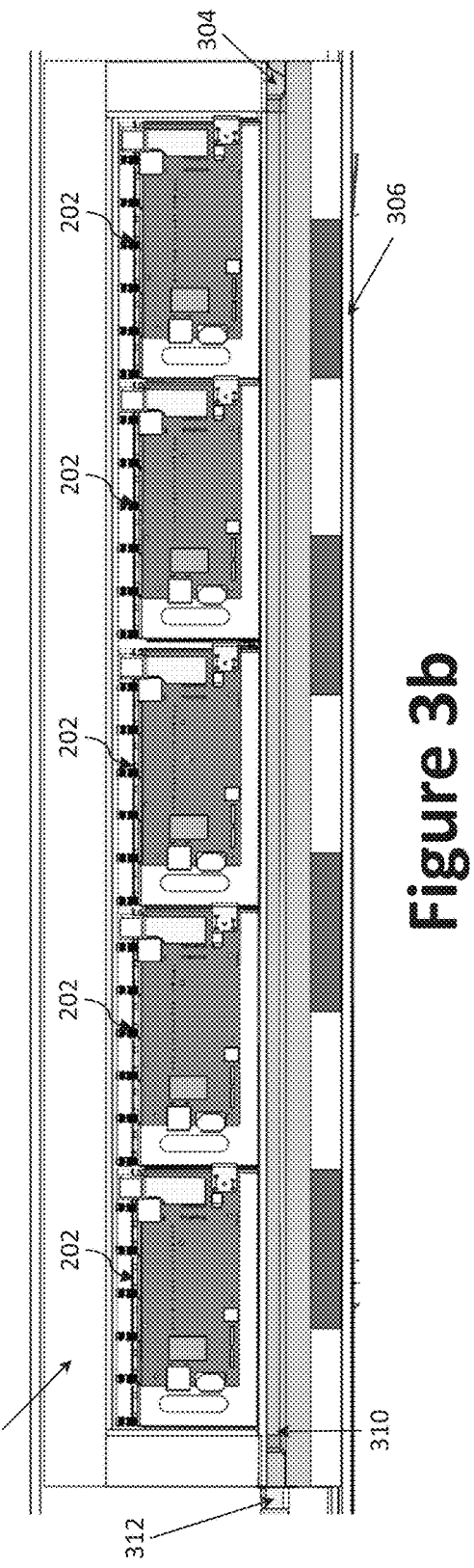
Figure 3a
Figure 3b

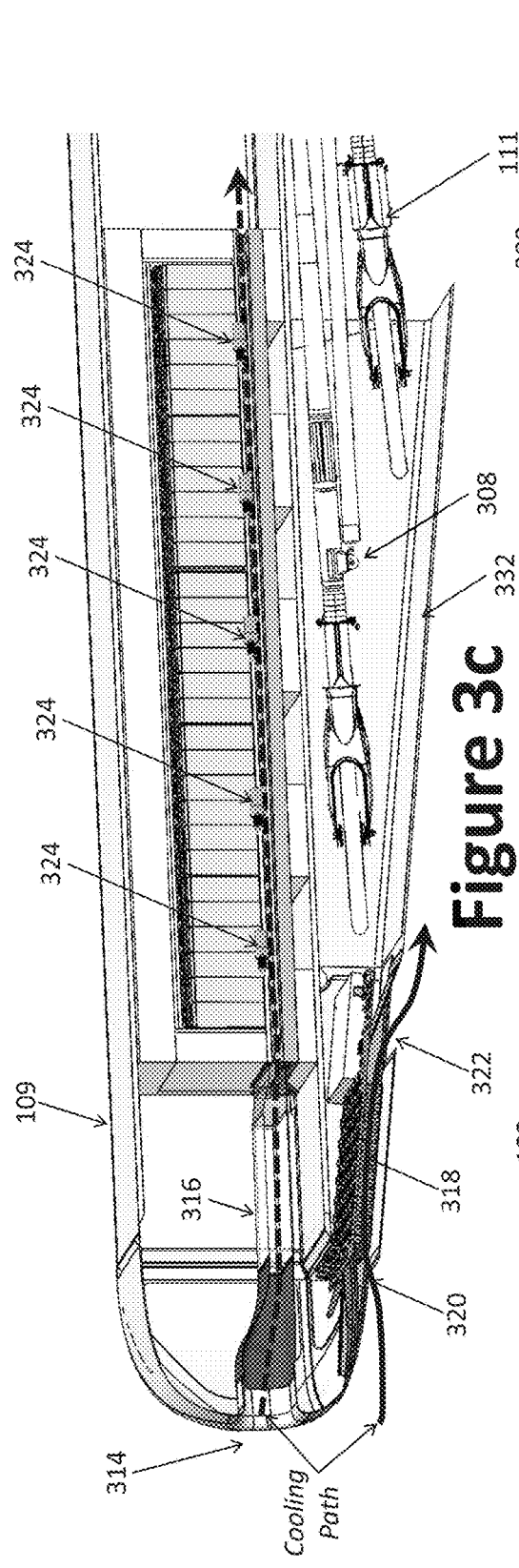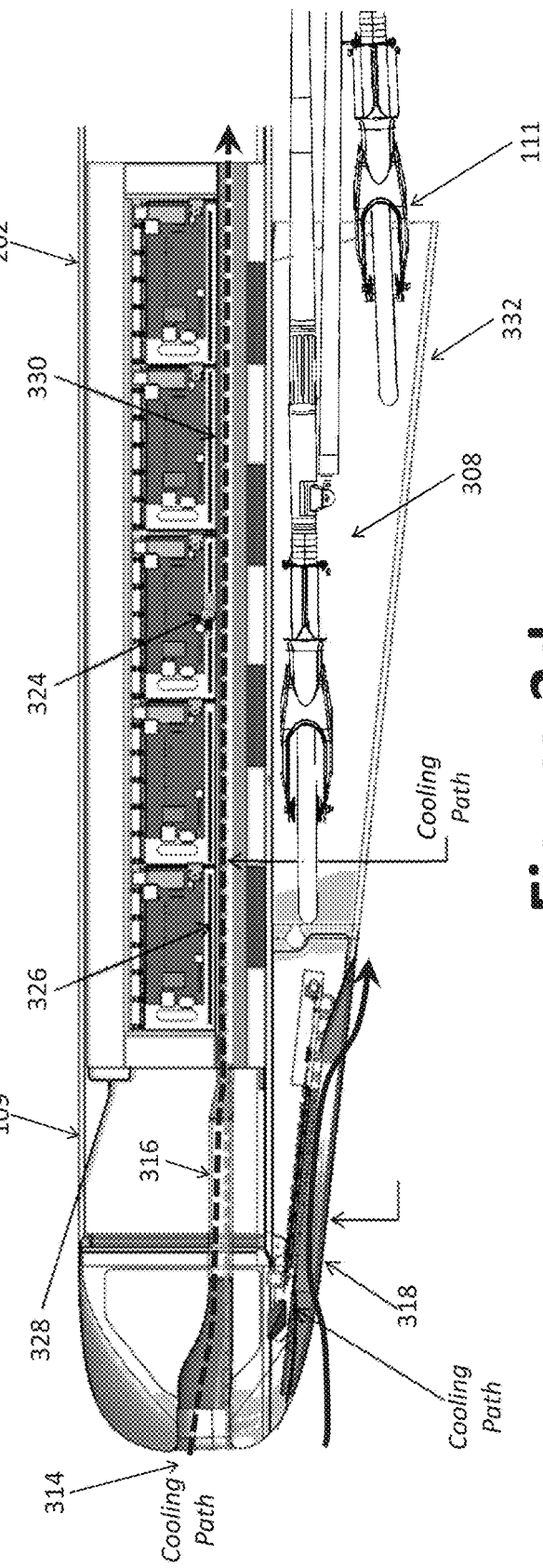

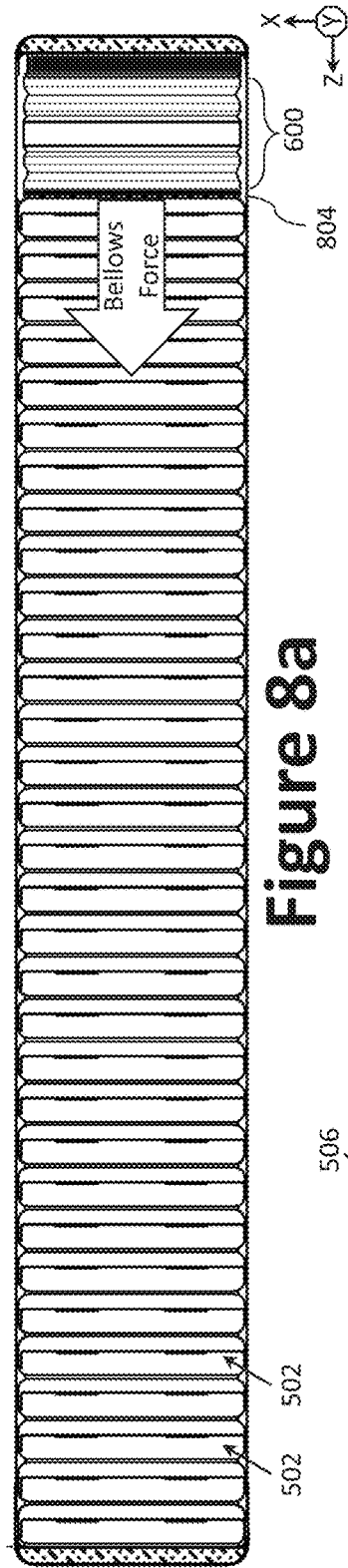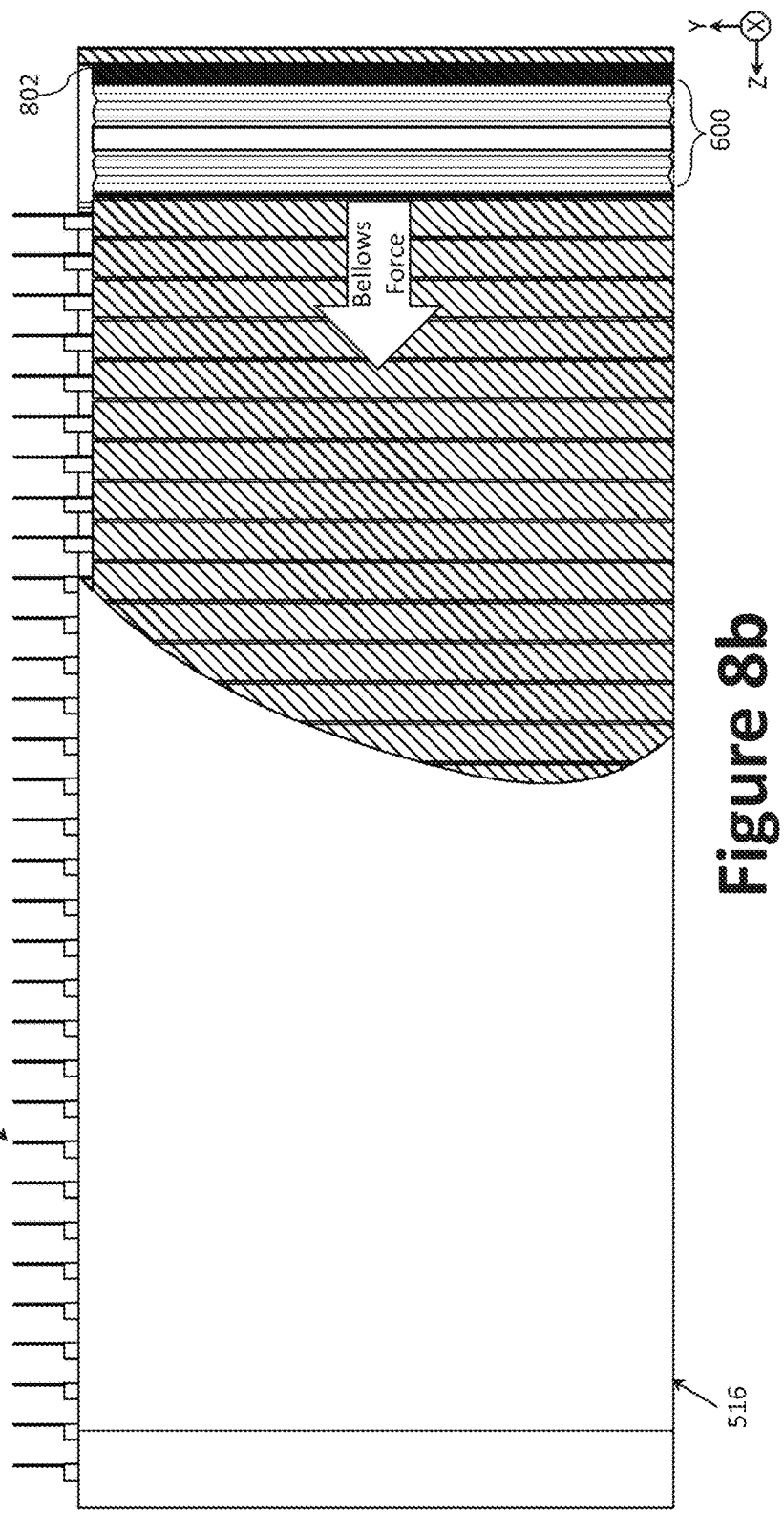
Figure 8a
Figure 8b

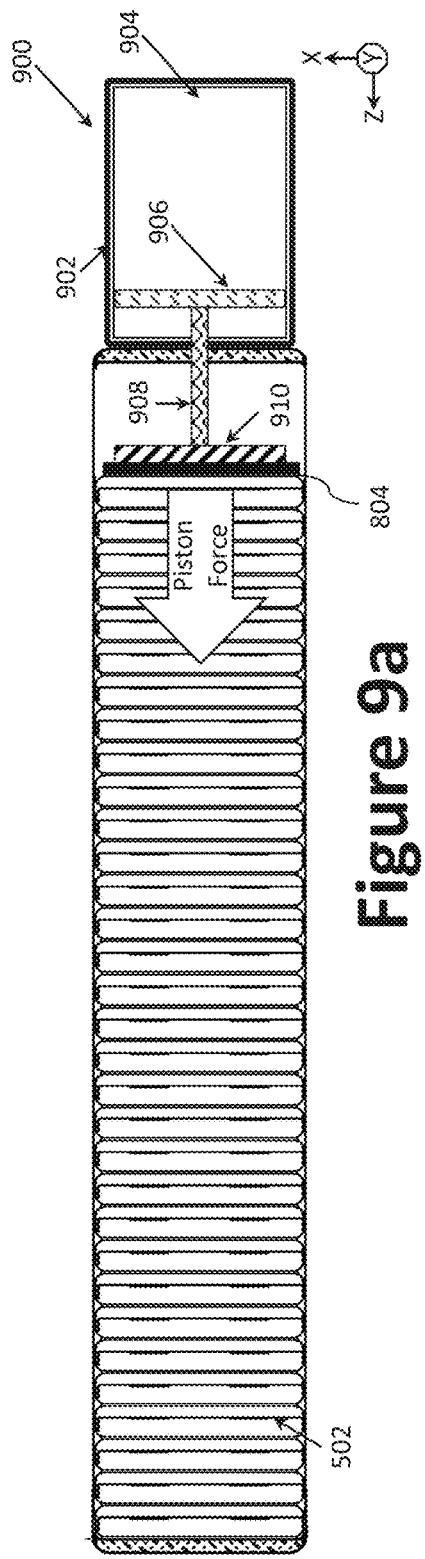
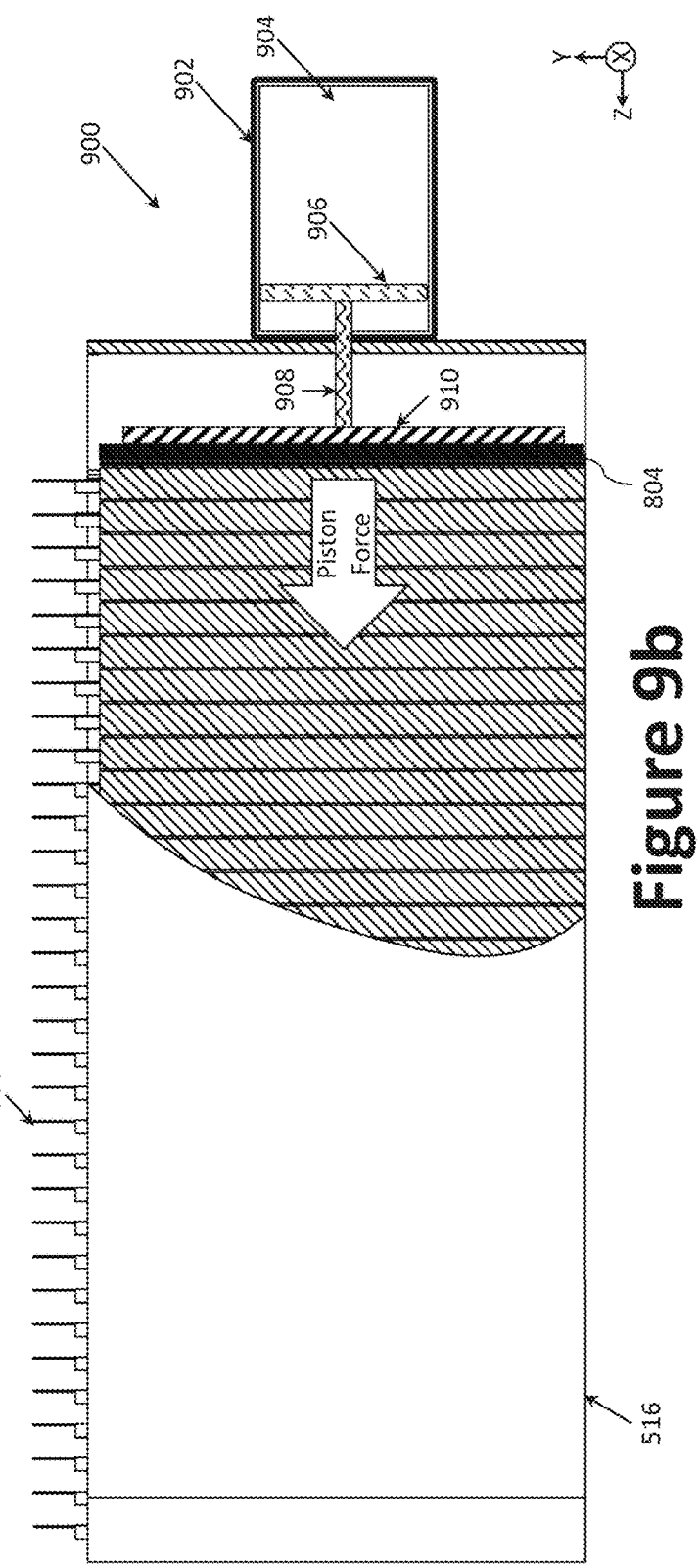

SYSTEM, METHOD, AND APPARATUS FOR BATTERY CELL-STACK COMPRESSION

FIELD OF THE INVENTION

The present disclosure relates to the manufacture of battery packs/assemblies and, more specifically, the manufacture of battery packs/assemblies for use in aircraft.

BACKGROUND

The concept of high-altitude, long-endurance, solar-powered aircraft has been demonstrated by a number of aerial vehicle research projects. Solar power systems typically rely on an array of solar panels that interface with a battery grid (or similar battery systems) through control circuitry, such as a maximum power point tracker. A maximum power point tracker provides a circuit assembly that, in operation, adjusts the load impedance presented to the array of solar panels to achieve a maximum power out of the solar array. The power collected out of the solar array is then stored to the battery packs/assemblies of the battery grid.

A battery pack may employ battery cells of various chemistries. Lithium-polymer cells are higher in specific energy density per unit weight than most other battery chemistries; including nickel cadmium, lead acid, silver oxide, mercury, and alkaline dry cells. Furthermore, lithium-polymer cells have a higher voltage output per cell than many other systems; therefore, fewer cells are needed to achieve a given battery voltage.

Lithium-polymer cells are available in a variety of formats and housings, including prismatic cell battery packs and pouch cell batteries. Unlike prismatic cell battery packs that are typically rigid, pouch cell battery packs employ a flexible pouch with conductive foil tabs to carry the positive and negative terminals from the battery cells to the outside of the pouch. Pouch cell battery packs (or simply, pouch cells) typically experience a performance benefit when pressure is applied perpendicularly to the pouch cell's internal layers (e.g., compressing the cell stack). Preferably, this pressure should remain constant as the pouch cells swell cyclically.

A number of advancements have been made in such battery pressure management. For example, U.S. Pat. Nos. 5,670,272 and 6,040,085, each to Cheu et al., describe battery packaging having, inter alia, a gas spring positioned in a housing structure containing the battery cell assembly. Cheu et al. also describes injection of an expanding compound through a nozzle to the housing to exert pressure on the battery cell assembly. However, such metallic (or plastic) structural methods are excessively heavy (or overly complex) when configured to withstand the necessary applied load over time and, therefore, are not suitable for ultralight aircraft applications.

In view of the foregoing, a need exists for a lightweight battery assembly with a pressure management system or apparatus that can overcome the deficiencies of the prior art. Such a lightweight battery assembly may be employed with ultralight aircraft applications, such as long endurance solar-powered aircraft.

SUMMARY

The present disclosure relates to the manufacture of battery packs/assemblies and, more specifically, the manufacture of battery packs/assemblies for use in ultralight applications and aircraft.

According to a first aspect, a battery pack comprises: a battery enclosure; a cell-stack having a plurality of battery cells, wherein the cell-stack is positioned within the battery enclosure; and a sealed container housing a volatile vapor, wherein the sealed container is positioned within the battery enclosure and configured to impart a force to compress the cell-stack.

In certain aspects, the sealed container is a pressurized bellows.

In certain aspects, the pressurized bellows comprises two flat ends and a sidewall.

In certain aspects, the sidewall is pleated.

In certain aspects, the sealed container is fabricated using a plastic polymer.

In certain aspects, the battery enclosure is a composite structure.

In certain aspects, the plurality of battery cells is interleaved with a plurality of cell spacers.

In certain aspects, the cell-stack comprises a plurality of distributed cell spacers.

In certain aspects, each of the plurality of distributed cell spacers is fabricated from a compliant material.

In certain aspects, the cell-stack does not include any cell spacers.

In certain aspects, each of the plurality of battery cells is a lithium polymer pouch.

In certain aspects, the plurality of battery cells is electrically coupled to one another to yield, in aggregate, a first nominal voltage.

In certain aspects, the plurality of battery cells is electrically coupled to one another using a printed circuit board (PCB).

In certain aspects, the battery pack assembly comprises a battery pack controller configured to monitor each of the battery pack and the second battery pack.

In certain aspects, the battery pack assembly is electrically coupled with a solar panel, wherein the solar panel is configured to charge the battery pack assembly. The solar panel can be coupled to a wing of an aircraft.

In certain aspects, the volatile vapor comprises diethyl ether, ethoxyethane, ethanol, pentane, or butyl acetate.

In certain aspects, the volatile vapor comprises sevoflurane, trichloroethylene, tetrachloromethane, desflurane, or tetrachloroethylene.

In certain aspects, the sealed container is positioned within the cell-stack between two of the plurality of battery cells.

BRIEF DESCRIPTION OF THE DRAWINGS

The foregoing and other objects, features, and advantages of the devices, systems, and methods described herein will be apparent from the following description of particular embodiments thereof, as illustrated in the accompanying figures; where like reference numbers refer to like structures. The figures are not necessarily to scale, emphasis instead being placed upon illustrating the principles of the devices, systems, and methods described herein.

FIGS. 1a through 1d illustrate an example solar-powered aircraft.

FIGS. 3a and 3b illustrate an example battery array.

FIGS. 3c and 3d illustrate an example battery array installed within an aircraft structure.

FIGS. 8a and 8b illustrate an example battery pack having a pressurized bellows within the enclosure to apply pressure on the cell-stack.

FIGS. 9a and 9b illustrate an example battery pack having a sealed piston device to apply pressure on the cell-stack.

DETAILED DESCRIPTION

Figure 1C:
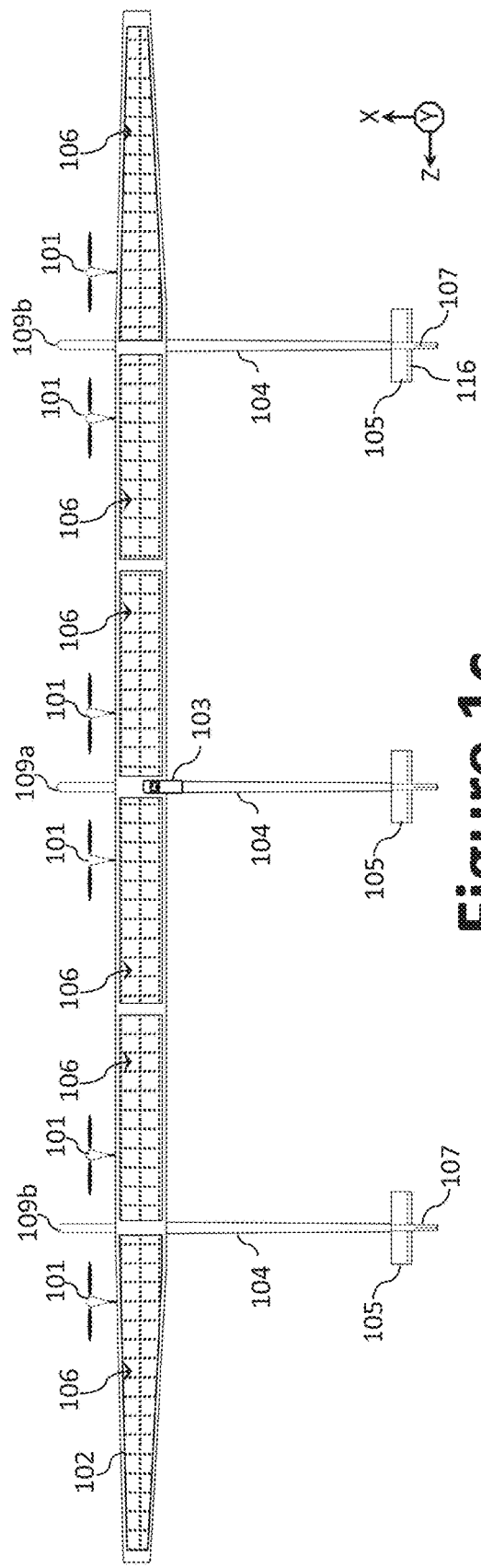

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within the range, unless otherwise indicated herein, and each separate value within such a range is incorporated into the specification as if it were individually recited herein.

The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "side," "front," "back," and the like are words of convenience and are not to be construed as limiting terms. As utilized herein the terms "circuits" and "circuitry" refer to physical electronic components (i.e., hardware) and any software and/or firmware ("code"), which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code.

The terms "aerial vehicle" and "aircraft" refer to a machine capable of flight, including, but not limited to, fixed-wing aircraft, unmanned aerial vehicle, variable wing aircraft, and vertical take-off and landing (VTOL) aircraft. VTOL aircraft may include fixed-wing aircraft (e.g., Harrier jets), rotorcraft (e.g., helicopters, multirotor, etc.), tilt-rotor/tilt-wing aircraft, multi-rotor aircraft, etc.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

The term "composite material" as used herein, refers to a material comprising an additive material and a matrix material. For example, a composite material may comprise a fibrous additive material (e.g., fiberglass, glass fiber ("GF"), carbon fiber ("CF"), aramid/para-aramid synthetic fibers, etc.) and a matrix material (e.g., epoxies, polyimides, and alumina, including, without limitation, thermoplastic, polyester resin, polycarbonate thermoplastic, casting resin, polymer resin, acrylic, chemical resin). In certain aspects, the composite material may employ a metal, such as aluminum and titanium, to produce fiber metal laminate (FML) and glass laminate aluminum reinforced epoxy (GLARE). Further, composite materials may include hybrid composite materials, which are achieved via the addition of some complementary materials (e.g., two or more fiber materials) to the basic fiber/epoxy matrix.

The term "composite laminates" as used herein, refers to a type of composite material assembled from layers (i.e., a "ply") of additive material and a matrix material.

The term "composite structure" as used herein, refers to structures or components fabricated, at least in part, using a composite material, including, without limitation, composite laminates.

The term "processor" means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with a memory device. The memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term "solar panel" refers to an array of one or more photovoltaic cells configured to collect solar energy to generate electrical power. The solar panels may employ one or more of the following solar cell types: monocrystalline silicon solar cells, polycrystalline silicon solar cells, string ribbon solar cells, thin-film solar cells (TFSC), cadmium telluride (CdTe) solar cells, copper indium gallium selenide (CIS/CIGS) solar cells, and the like. To reduce overall weight and to improve reliability and durability, it is advantageous to employ light weight and/or flexible solar panels (e.g., thin-film solar panels).

Figure 1D:
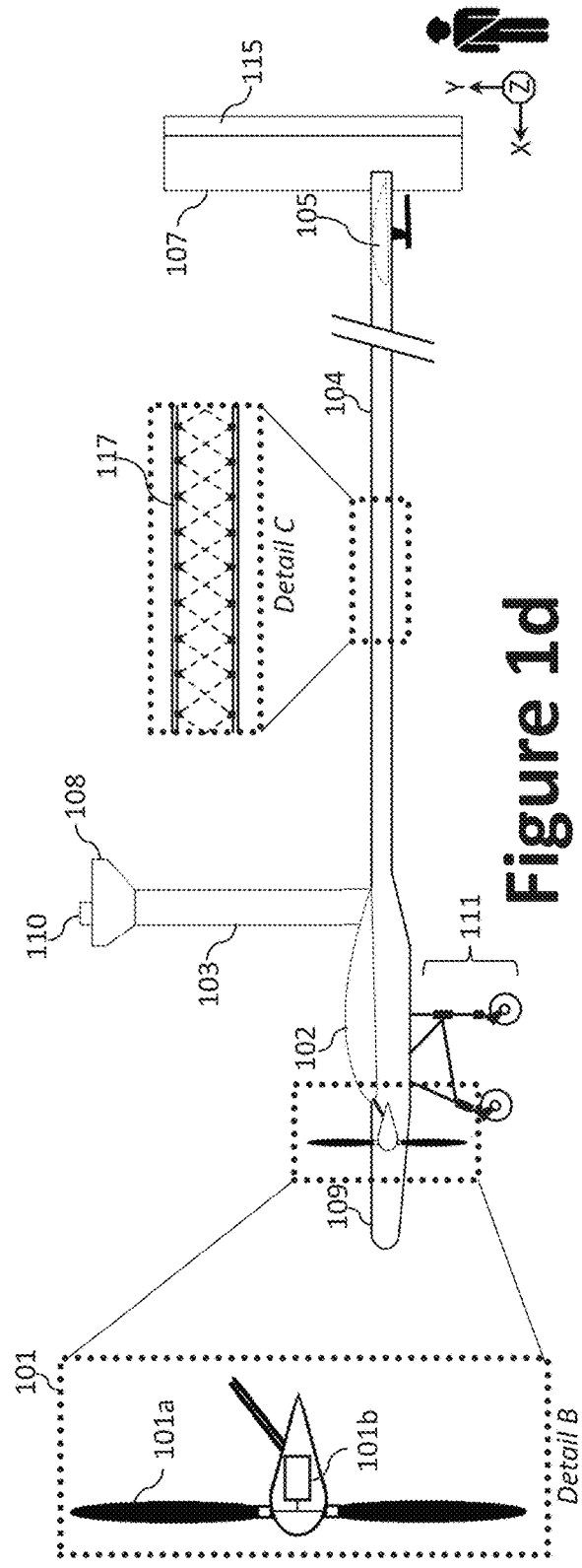

FIGS. 1a through 1d illustrate an example solar-powered aircraft 100. Specifically, FIG. 1a illustrates an isometric view of the solar-powered aircraft 100, while FIGS. 1b through 1d illustrate, respectively, front, top, and side views of the solar-powered aircraft 100. The various structural components of the aircraft 100 may be fabricated from metal, a composite material, or a combination thereof. For example, the wing 102 may be fabricated using fused deposition modeling (FDM), stereolithography (SLA), selective laser sintering (SLS), and/or any other suitable type of additive manufacturing/3D printing. A benefit of this fabrication method is that it produces a high-performing, more stable aircraft, using advanced sensing and 3D printing disciplines. FDM is a thermal polymer layer deposition process that produces components one layer at a time, effectively printing aircraft components rapidly, in low-volume, and to exacting material specifications. Using FDM, numerous wing design iterations may be inexpensively manufactured to meet desired strength and stiffness requirements, control surface sizing, and other characteristics. Further, additional wing panels/components may be fabricated to allow for tailored sensor integration, ease of generating additional actuation schemes or altering the control surface placement, ease of characterizing the strain on the wing, and an ability to easily alter the wing's stiffness to provide the best platform for proprioceptive sensing in a given application. This capability also offers robustness against wing damage, as replacement components are readily reproducible.

The solar-powered aircraft 100 generally comprises a wing 102, one or more propulsors 101 (e.g., a propeller 101a and associated gearing, which is axially driven by one or more electric motors 101b), a plurality of fuselages 109 (e.g., a center fuselage 109a and a set of outboard fuselages 109b), a plurality of tail booms 104 (e.g., a center tail boom 104b and a set of outboard tail booms 104a, 104c; each illustrated as an elongated boom coupled to the aft end of a fuselage 109), a plurality of tail sections 112, a payload mast 103, and landing gear 111. As illustrated, the wing 102 comprises a first wing tip 114a (port side), a second wing tip 114b (starboard side), and a midpoint 114c along the wing's 102 wingspan that is approximately half way between the first wing tip 114a and the second wing tip 114b.

Each propulsor 101 generally comprises a motor 101b coupled to, and configured to drive/rotate, a propeller 101a. Detail B of FIG. 1d best illustrates the propeller 101a and motor 101b, where the nacelle has been partially removed. The motor 101b may be an electric motor controlled via an electronic speed controller (ESC). To that end, an ESC may also be provided to control the motor 101b, which may be coupled (or otherwise integrated) with the wing 102 (e.g., as part of a nacelle pod). The propulsor 101 may be positioned on the wing 102, the tail boom 104 (e.g., at the proximal end), or a combination thereof. For example, each of the propulsors 101 may be positioned on, or within, the wing 102 (e.g., wing-mounted, as illustrated) in either a pusher configuration or a tractor configuration (as illustrated). Further, while each fuselage 109 is illustrated as having two propulsors 101 associated therewith, additional or fewer propulsors 101 may be provided. Regardless of the propulsion configuration, each of said plurality of propulsors 101 may be oriented to direct thrust toward the distal end of the tail boom 104 (aft).

The wing 102 and/or the horizontal stabilizer 105 may comprise an array of solar panels 106 to generate power. As illustrated in FIG. 1a, the solar panels 106 may be positioned along the upper surface of the center wing panel 102b and a portion of each of outboard panels 102a, 102c. Alternatively, the solar panels 106 may be positioned along the entire length of the 102 as illustrated in FIG. 1c. The solar-powered aircraft 100 may further comprise one or more energy storage devices operatively coupled to the solar panels 106 to power the vehicle management system 218 and various electric loads. The one or more energy storage devices store collected solar energy for later use by the solar-powered aircraft 100 (e.g., when sunlight is unavailable, typically at nighttime). As used herein "energy storage device" refers to a battery or similar instrumentality known to those of skill in the art capable of storing and transmitting energy collected from the solar panels 106, including but not limited to a rechargeable battery (e.g., lithium-polymer batteries), a regenerative fuel cell, or combinations thereof.

While the wing 102 is illustrated as generally linear with tapered outboard portions, other configurations are contemplated, such as back-swept, tapered, rectangular, elliptical, forward-swept, and the like. Therefore, the wing 102 may be any type of fixed wing, including, but not limited to, a straight wing, a swept wing, a forward swept wing, a dihedral wing (an upward angle from horizontal), an anhedral wing (a negative dihedral angle—downward angle from horizontal), or any other suitable type of fixed wing as known by those of ordinary skill in the art. The length of the wingspan may be, for example, 40 to 160 meters, more preferably, 60 to 120 meters, most preferably about 80 meters. While the leading and trailing edges of the wing 102 are illustrated as tapered along the outboard portion of its wingspan length, the wing 102 may be entirely straight/linear. As illustrated, the wingspan of the wing 102 may be substantially perpendicular relative to the longitudinal length of the fuselages 109 and tail booms 104; however, the wing 102 may instead be swept back or swept forward. In certain aspects, the wing 102 may be modular and configured for disassembly; thereby allowing the solar-powered aircraft 100 to be more easily transported by land and/or to physically fit within a hanger or other structure for storage. For example, the wing 102 may be fabricated from a plurality of wing panel modules (e.g., a center wing panel 102b, and a set of outboard panels 102a, 102c) and removably joined to one another ended to end via a set of field joints 113. Each of the field joints 113 may employ one or more fasteners (e.g., bolts, clips, etc.) to facilitate coupling therebetween.

As can be appreciated, control surfaces on the wing typically require additional structural reinforcements and actuators, which result in additional weight. In addition, adding control surfaces to a wing increases the drag during flight. Further, control surfaces on a wing can also require that the skin panel be broken into sections, as opposed to having a substantially unbroken construction that allows for the solar panels 106 to cover more of the upper surface of the wing 102. Finally, manufacturing control surfaces adds complexity as attachment mechanisms, hinges, more parts, and/or multiple skin panels must be made. Removing the control surfaces, however, eliminate these complexities. Therefore, unlike traditional aircraft, the wing 102 need not include movable control surfaces (e.g., flaps, slats, etc.) along the trailing or leading edges of its wingspan. Indeed, to reduce weight and complexity, the wing 102 may be generally devoid of movable control surfaces. For example, the upper and lower surface of the wing 102 may be fabricated as a single piece structure without any moving parts. Control of the wing 102 may instead be achieved through control surfaces positioned on one or more of the tail sections 112 positioned at the distal end of each tail boom 104. Example control methods are described in described in greater detail by commonly owned U.S. patent application Ser. No. 15/702,441 to Daniel Uhlig et al., which was filed on Sep. 12, 2017 and is titled "Wing-Twist Controlled Aircraft."

The payload mast 103 may be coupled at its proximal end to a fuselage 109 (e.g., the center fuselage 109a, as illustrated) and oriented generally perpendicularly to the longitudinal length of the center fuselage 109a and the lateral length of the wing 102. The payload mast 103 may be, for example 2 to 6 meters, or about 4 to 5 meters in height (e.g., above the fuselage 109). The distal end of the payload mast 103 may comprise a crow's nest structure 108 to house or otherwise support a payload 110. As illustrated, the leading edge/surface of the payload mast 103 and the crow's nest structure 108 may be aerodynamically shaped to reduce drag and turbulence during flight. Detail A of FIG. 1a best illustrates the crow's nest structure 108. Note that multiple sensor payload devices (e.g., at least two, or, as illustrated, three) may be positioned on the crow's nest structure 108 and oriented in different directions via a gimbal system.

Positioning the payload 110 at the distal (upper) end of the payload mast 103 helps to provide a large, unobstructed field of view, which is particularly useful where a direct line-of-sight is important (e.g., in optical systems). While a payload 110 is illustrated atop the payload mast 103, additional payloads may be provided elsewhere in the solar-powered aircraft 100, including the fuselages 109, the wing 102, tail booms 104, etc. For example, the one or more payloads 110 may be configured as a payload pod that is rotatably and pivotally coupled to the solar-powered aircraft 100 via a gimbal system, such as an underside surface to enable the payload pod to be oriented downward to monitor objects on the ground.

As used herein, "payload" refers to one or more sensors, communications packages, weapons systems, instruments, antennas, cameras, radars, navigation systems, flight control systems, or other cargo. For example, navigation and flight control systems may be communicatively coupled with an inertial navigation system ("INS") that is communicatively coupled with an inertial measurement unit and global positioning system ("GPS") receiver, an onboard data storage device (e.g., hard drive, flash memory, or the like), a wireless communication device, or virtually any other desired services. The GPS gives an absolute drift-free position value that can be used to reset the INS solution or can be blended with it by use of a mathematical algorithm, such as a Kalman Filter. The payload 110 may also serve as a communication relay between a remote device (e.g., a satellite/base station) and a device on the ground.

The plurality of tail booms 104 may include a center tail boom 104b and a set of outboard tail booms 104a, each of which includes a proximal end and a distal end. As illustrated, the proximal end of a first outboard tail boom 104a may be secured to a first outboard fuselage 109b (or the wing 102) and positioned at a point that is between the midpoint 114c and the first wing tip 114a, the proximal end of the second tail boom 104 may be secured to a second outboard fuselage 109b and positioned at a point that is between the midpoint 114c and the second wing tip 114b, and the third tail boom 104 may be secured to the center fuselage 109a at (or near) the midpoint 114c. Each tail boom 104 comprises a proximal end and a distal end, where each of the tail booms 104 may be secured at its proximal end to fuselage 109, while being coupled to a tail section 112 at its distal end. As best illustrated in FIG. 1d, the solar-powered aircraft 100 (e.g., the tail booms 104, fuselages 109, etc.) may be fabricated using a tubular core structure 117, which is then covered with aircraft skin (e.g., composite materials, fabric, metal, metals alloys, etc.). Detail C of FIG. 1d best illustrates the tubular core structure 117, where the aircraft skin has been removed. In certain aspects, the tail boom 104 and the fuselage 109 may be fabricated as a single, unitary component. As illustrated, though not required, the plurality of tail booms 104 may be evenly distributed along the length of the wing's 102 wingspan. While the solar-powered aircraft 100 is illustrated as having three fuselages 109 and three tail booms 104, a person of skill in the art would understand that additional, or fewer, fuselages 109/tail booms 104 may be employed to achieve a desired function and as a function of, for example, the length of the wing 102.

To facilitate takeoff and landing, the solar-powered aircraft 100 may be provided with one or more sets of landing gear 111 (e.g., one per fuselage 109), which may be positioned on the undercarriage of the aerial vehicle. For example, a set of landing gear 111 may be provided at the underside of the fuselage 109 and/or tail boom 104. The landing gear 111 may employ, inter alia, a set of wheels (as illustrated) and/or skids. In operation, the landing gear 111 serves to support the solar-powered aircraft 100 when it is not flying; thereby allowing it to take off, land, and taxi without causing damage to the airframe. Where desired and at the expense of added weight, the wheels may include brakes and/or be powered by a motor, such as an electric motor. Further, the wheels may be equipped with shock absorbers, or more advanced air/oil oleo struts, to permit runway and rough terrain landing. To decrease drag in flight, the landing gear 111 may be retracted into a landing gear bay 304 (also called a wheel well) defined by, for example, the fuselage 109, the wing 102, tail boom 104, or another component of the airframe. The landing gear bay 304 may be concealed behind one or more bay doors 306 (or panels), thereby further decreasing drag in flight. In operation, the bay doors 306 are selectively opened to allow for the landing gear 111 to egress.

As illustrated, each tail section 112 may comprise one or more one control surfaces to steer the tail section 112 in a desired direction. For example, each tail section 112 may comprise a vertical stabilizer 107 (e.g., a dorsal fin) extending vertically from the tail boom 104, a rudder 115 operatively coupled to the vertical stabilizer 107, a horizontal stabilizer 105 extending laterally from either side of the tail boom 104, and an elevator 116 (or portion thereof) operatively coupled to each side of the horizontal stabilizer 105. In certain aspects, the tail section 112 may employ one or more all-moving components (e.g., a stabilator). The elevators 116 may be configured to change the pitch of the tail section 112, while the rudder 115 may be configured to change the yaw of the tail section 112. The solar-powered aircraft's 100 tail sections 112 be selectively controlled (e.g., via a flight controller/vehicle management system 218) to control the overall pitch, roll, and yaw of the solar-powered aircraft 100, thereby obviating the need for movable control surface on the wing 102. The pitch and/or yaw of the tail sections 112 may be separately controlled via the rudders 115 and/or elevators 116 to create a local force moment at the location the tail boom 104 attaches to the wing 102.

Each rudder 115 may be rotatably and/or hingedly coupled to a vertical stabilizer 107 via one or more hinges to enable the rudder 115 to move about an axis defined by the vertical stabilizer 107 at its trailing edge. Similarly, the elevators 116 may be rotatably and/or hingedly coupled to the horizontal stabilizer 105 via one or more hinges to enable movement about an axis defined by the horizontal stabilizer 105 at its trailing edge. In certain aspects, one or more of the rudders 115 and/or the elevators 116 may additionally be configured with a mechanism (e.g., rails, tracks, etc.) to allow for other, non-rotatable movement, such as, for example, sliding and/or lateral movement relative to the vertical or horizontal stabilizer. In alternative embodiments, one or more of the rudders 115 and/or the elevators 116 may be omitted entirely from a given tail section 112. Depending on the desired tail configuration, the horizontal stabilizer 105 and vertical stabilizers 107 may be operatively coupled to one another as well as the tail booms 104, or operatively coupled only to the tail booms 104. The tail section 112 may be configured in one of multiple tail configurations, including, for example, fuselage mounted, a cruciform, T-tail, a flying tailplane, a pi-tail (i.e., π-tail), a V configuration, an inverted V configuration (i.e., "/\" configuration), a twin tail (H-tail arrangement or U-tail arrangement), etc. Further, the horizontal stabilizer 105 may be straight, back-swept, tapered, rectangular, elliptical, forward-swept, etc. In certain aspects, the tail section 112 may employ a combination H- and /\-tail arrangement where the tail section 112 comprises /\-tail surfaces that couple to the horizontal stabilizer 105 to provide a combination H- and /\-tail arrangement. An example combination H- and /\-tail arrangement is described in greater detail by U.S. patent application Ser. No. 15/494,780 to Robert W. Parks et al., which was filed on Apr. 24, 2017 and titled "Vertical Take-Off and Landing Aircraft."

Persons of ordinary skill in the art will recognize that alternative and/or additional structural arrangements may be implemented to accommodate the design and/or operational requirements of the tail section 112. For example, the tail section 112 may instead employ only one or more vertical stabilizer 107, one or more horizontal stabilizer 105, and/or slanted or offset stabilizers that have both horizontal and vertical dimensions. Additionally, or alternatively, the tail section 112 may include multiple rudders 115 on the vertical stabilizer 107 and/or a plurality of elevators 116 on each side of the horizontal stabilizer 105.

Figure 2:
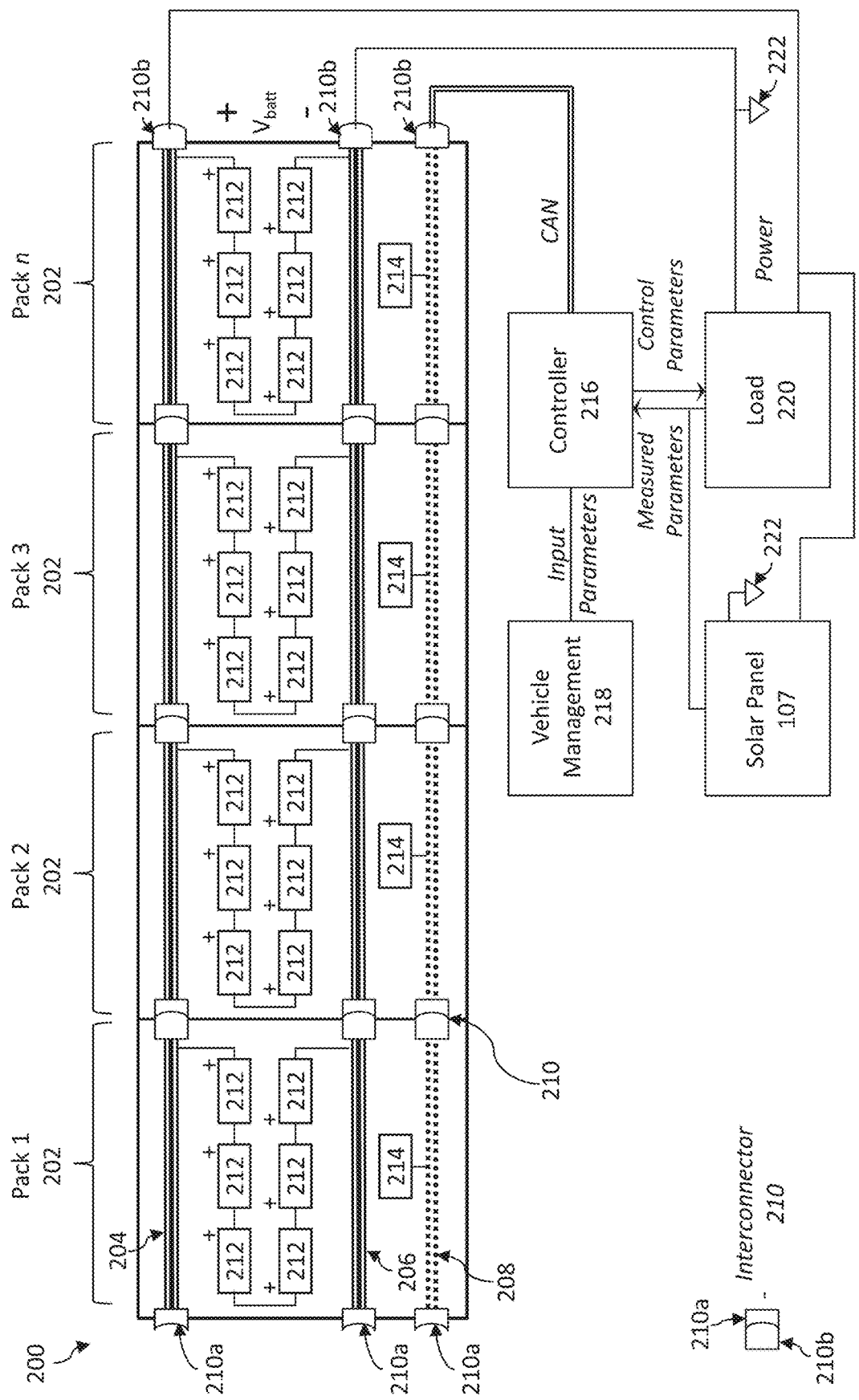
FIG. 2 illustrates an example solar power system having a battery array.

As illustrated in FIG. 2, the solar-powered aircraft 100 may be equipped with one or more battery arrays 200 to supply power to the various electric loads 220. The solar-powered aircraft 100 may employ a vehicle management system 218 operable to control the various functions of the solar-powered aircraft 100 and/or one or more payloads 110. The electric load 220 may include, for example, the payload 110, one or more motors (e.g., the motors 101b used in connection with the propulsors 101), actuators (e.g., to control the flight control surfaces, landing gear 111, bay doors, and the like), etc. Each battery array 200 generally comprises a plurality of battery pack assemblies 202 (e.g., Pack 1, Pack 2, Pack 3, Pack n, as illustrated) electrically coupled to each other; thereby defining a power supply line 204, a ground line 206, and, where desirable, a data communication line 208. The ground line 206 may be electrically coupled to an equipotential point 222 (e.g., ground). The data communication line 208 may be shielded so as to mitigate electromagnetic interference (EMI) for, inter alia, the power supply line 204. The data communication line 208 may be coupled to one or more sensors 214 or devices that monitor or control, for example, the health and/or operating parameters (e.g., temperature, humidity, voltage, etc.) of each battery pack assembly 202 or battery pack 212.

The battery pack assemblies 202 within a battery array 200 may be electrically connected to one another via one or more interconnectors 210 to facilitate the passing of power and/or data signals from one battery pack assembly 202 to another battery pack assembly 202. The interconnectors 210 may employ, for example, a first connector 210a (e.g., a female connector) and a second connector 210b (e.g., a male connector) configured to mate with one another. For example, when arranged in a row/string, power and/or data signals may be conveyed from one end (e.g., proximal end) of a battery array 200 to an opposite end (e.g., distal end) of the battery array 200 via the interconnectors 210; each of which can provide pass through functionality in the event of an isolated battery pack assembly 202 failure. For instance, the battery pack assemblies 202 can integrate the power rails (e.g., power supply line 204, ground line 206) and data communication lines 208 with in-line connections such that battery pack assemblies 202 can be attached to one another to form continuous power and data pathways for feeding the load and interacting with the system controller 216.

In certain aspects, the battery array 200 can be expanded and contracted as needed (e.g., additional battery pack assemblies 202 may be connected or disconnected). In other words, power and/or data signals are carried across the battery array 200, thereby only requiring an electrical connection at one end of the battery array 200. Consequently, an energy storage system having such battery arrays 200 provides for quick electrical and mechanical integration. Further, the battery pack assemblies 202 may be fabricated in bulk, thereby obviating the need for costly, complicated, and potentially unreliable harness. In operation, the system controller 216, which may be processor controlled, monitors each of the one or more battery arrays 200 (and separately, each battery pack assembly 202), the one or more solar panels 106, and the one or more electric loads 220. For instance, in response to an input parameter (e.g., an instruction from the solar-powered aircraft's 100 vehicle management system 218), the system controller 216 may adjust the electric load 220 and/or adjust (or reallocate) power from the one or more battery arrays 200 to meet the electric load's 220 needs. To that end, the system controller 216 may be operatively coupled with a plurality of battery pack controllers 406, which are described below in connection with FIG. 4. The system controller 216 may communicate through either a simplex or redundant communications bus to each of the battery pack assemblies 202 in an energy storage system (e.g., battery array 200). The system controller 216 may employ one or more control area network (CAN) buses. In certain aspects, the battery array 200 may employ a power allocation switching unit system and/or algorithm for managing battery groups and solar panels. An example power allocation switching unit system is described in greater detail by commonly owned U.S. Patent Publication No. 2017/0331323 to Adam Scott Ehrmantraut et al., filed on May 12, 2017 and titled "Solar Power System and Method Thereof."

FIGS. 3a and 3b illustrate an example battery array 200, while FIGS. 3c and 3d illustrate the example battery array 200 installed within an aircraft structure (e.g., a fuselage 109, or other aircraft structure). Specifically, FIG. 3a illustrates an isometric view of the battery array 200, while FIG. 3b illustrates a side plan view thereof. As illustrated, a plurality of battery pack assemblies 202 (e.g., 2 to 20 assemblies, or 5 assemblies, as illustrated) may be electrically coupled to one another (e.g., in a string) and secured within a battery array housing defined by the housing cover 302 and the housing tray 306. To regulate the temperature of the battery pack assemblies 202, a fluid (e.g., air) may be conveyed into the battery array housing and across the battery pack assemblies 202 via the front cooling door 310, whereby the air exits the battery array housing via the rear cooling door 304. The front cooling door 310 may employ a front duct adapter 312 to allow for air to pass from an inlet (e.g., the leading edge of a fuselage 109) to the front cooling door 310. To provide an insulating function, each of the front cooling door 310 and rear cooling door 304 may be closed; thereby sealing the battery array housing.

FIGS. 3c and 3d illustrate cut away views of a fuselage 109 having a battery array 200 installed therein. As illustrated, the battery array 200 may be positioned just above the landing gear bay 308 that houses the landing gear 111 when retracted. As illustrated, the landing gear bay 308 comprises a set of bay doors 332 to conceal the landing gear 111 during flight, thereby reducing drag. The battery array 200 is preferably sufficiently flexible to account for flexing of the solar-powered aircraft 100 or components thereof (e.g., the fuselage 109). To that end, the battery pack assemblies 202 may be spaced to provide a gap between adjacent battery pack assemblies 202. As illustrated, the leading edge of the fuselage 109 may define an air inlet 314 to receive and guide fluid (e.g., a cooling air path) to the battery array housing via an air duct 316, the front duct adapter 312, and front cooling door 310. A second cooling path may be used to cool on-board electronics 318 (e.g., an Array Consolidation and Switching Unit (ACSU)) via a second air inlet 320 and air outlet 322. As illustrated, the second air inlet 320 may be positioned near the leading edge, just below the air inlet 314. Insulation 328 (e.g., foam, such as PHMUL, Rohacell 31, etc.) may be provided on each side of the housing cover 302 and below the housing tray 306 to assist in temperature regulation.

Each of the battery pack assemblies 202 may include a resistive heater 326 (e.g., a mat) and a thermal actuator 324 (e.g., a wax actuator). In the event the temperature of one or more battery pack assemblies 202 drops below a predetermined temperature, the one or more battery pack assemblies 202 may be selectively heated using a resistive heater 326. Therefore, each of the resistive heaters 326 may be independently controlled. The thermal actuator 324 may be, for example, a linear actuator that converts thermal energy into mechanical energy by exploiting the phase-change behavior of waxes. The thermal actuator 324 may be used to open the cooling door. For example, one or more thermal actuators 324 may be used. Alternatively, a single solenoid (e.g., an electric actuator) may be used to open the cooling path. To assist with cooling, a tapered insulation barrier 330 layer may be positioned within the fuselage 109 beneath each of the battery pack assemblies 202 to mitigate temperature gradient.

Figure 4:
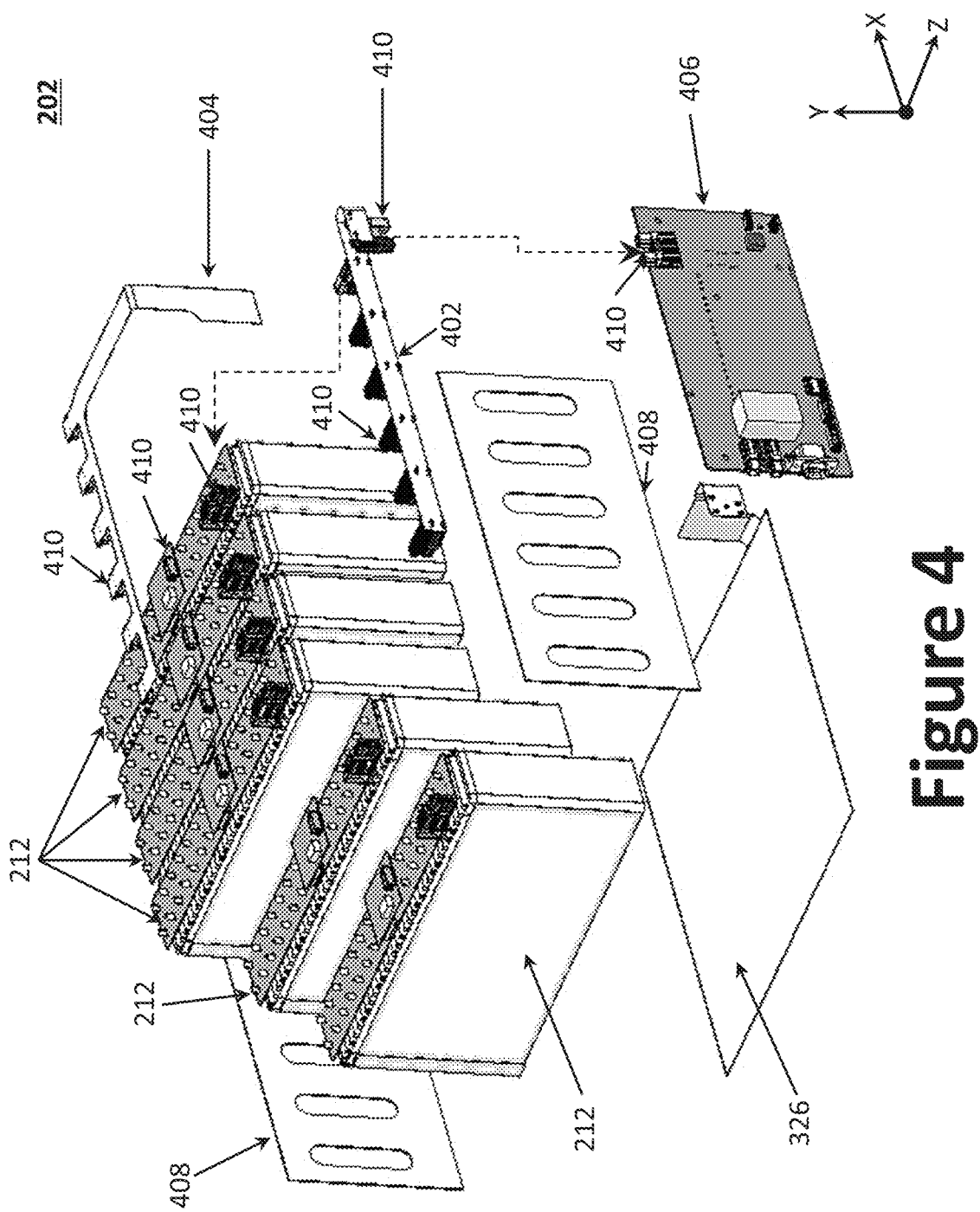
FIG. 4 illustrates an assembly view of an example battery pack assembly.

FIG. 4 illustrates an assembly view of an example battery pack assembly 202. As illustrated, the battery pack assembly 202 may comprise a plurality of battery packs 212, an internal power harness 402, an internal data harness 404, a battery pack controller 406, and a set of shear walls 408. The internal power harness 402 serves to interconnect the output terminals of the battery packs 212 (e.g., via the power interface connectors 510), while the internal data harness 404 serves to interconnect the various sensors coupled to battery packs 212 (e.g., via the data interface connectors 508). The battery packs 212 may be electrically arranged and connected in a series configuration, in a parallel configuration, or a combination thereof to achieve a desired nominal voltage and/or power. The battery pack controller 406, which is operably coupled to each of the internal power harness 402 and internal data harness 404, monitors and adjusts parameters of the battery pack assembly 202 during operation. The battery pack controller 406 may be operatively coupled with the system controller 216 to receive commands/instructions from the system controller 216 and to provide feedback thereto (e.g., measured parameters, operating status, etc.). As illustrated, the battery pack controller 406 may couple to each of the internal power harness 402, the internal data harness 404, and the resistive heater 326 using one or more plugs/connectors 410. The set of shear walls 408 increases the structural integrity of the battery pack assembly 202 by mitigating/reducing shifting or flexing of the battery packs 212. The set of shear walls 408 is preferably fabricated from a material that is non-conductive, light weight, and rigid (or semi-rigid). In one example, the set of shear walls 408 may be fabricated using a composite material. While the example battery pack assembly 202 is illustrated as having six battery packs 212, one of skill would appreciate that additional or fewer battery packs 212 may be employed depending on the power needs and/or desired nominal voltage.

Figure 5:
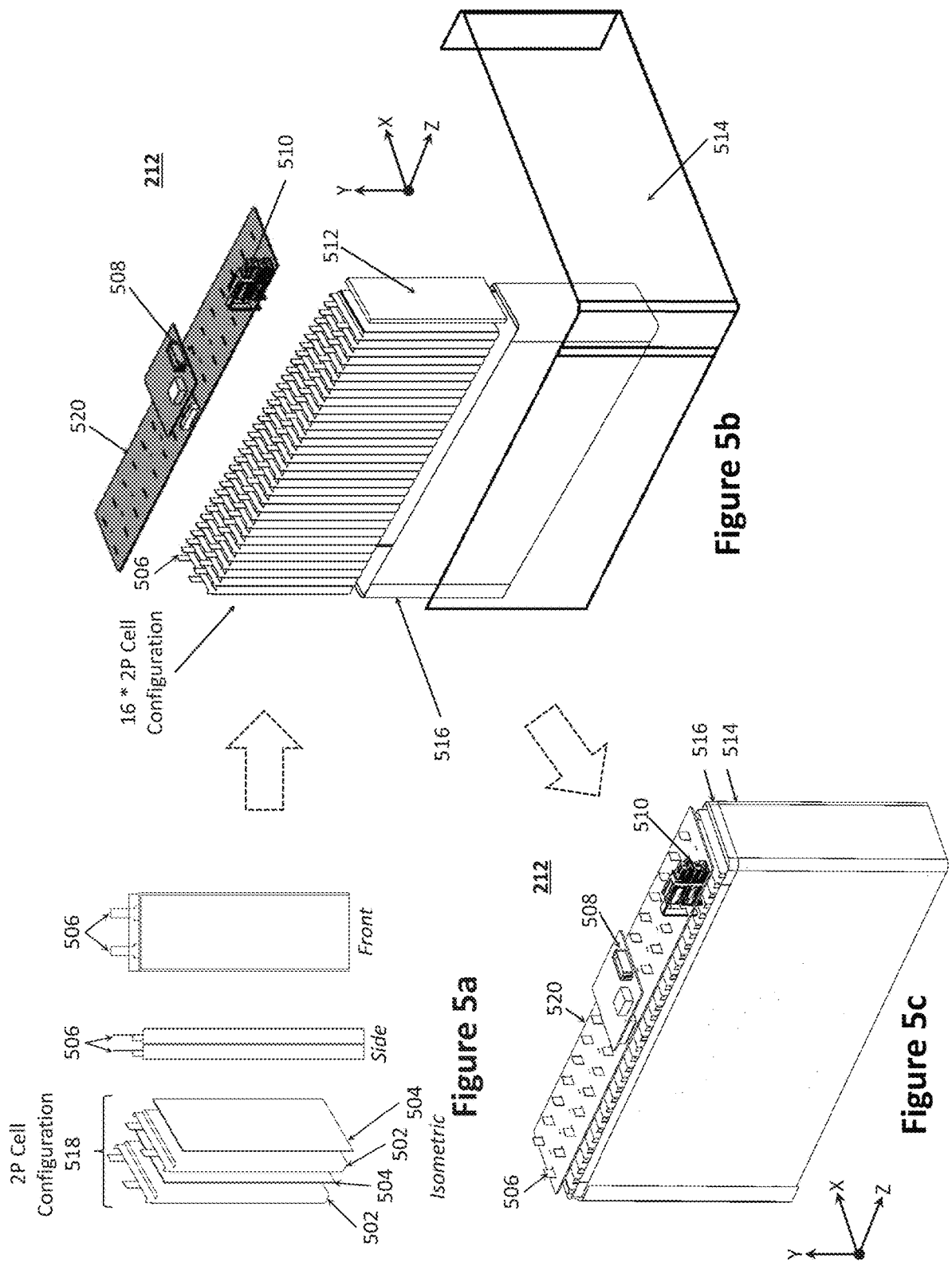
FIGS. 5a through 5c illustrate assembly views of an example 2p pouch cell assembly and an example battery pack composed of a plurality of 2p pouch cell assemblies.

FIGS. 5a through 5c illustrate an example battery pack 212 at various stages of assembly. Specifically, FIG. 5a illustrates an example 2p pouch cell assembly 518 used in the battery pack 212, while FIG. 5b illustrates an assembly view of the battery pack 212 and FIG. 5c illustrates a fully assembled battery pack 212. With reference to FIG. 5a, isometric, side, and front views of an example 2p pouch cell assembly 518 are provided. As illustrated, the 2p pouch cell assembly 518 generally comprises a set of battery cells 502 interleaved with a set of cell spacers 504. While the thickness can vary, the height and width of the battery cells 502 and cell spacers 504 may be substantially the same; though the cell spacers 504 may be slightly smaller, as illustrated. The one or more battery cells 502 may be, for example, lithium-polymer pouch cells; however other battery cell types/chemistries are contemplated, such as lithium-ion, nickel-cadmium (NiCd), nickel-metal hydride (NiMH), etc.

Each of the cell spacers 504 may have a thickness of 0.5 to 1.0 mm, or about 0.8 mm. The modulus of the cell spacers 504 (i.e., force vs displacement) is at least partially responsible for applying the internal pressure load of the battery enclosure 516 onto the battery cells 502 (e.g., the cell-stack). The cell spacers 504 may employ a density ranging from 0.8 to 20 pounds per cubic foot (PCF), more preferably about 1.5 to 6.0 PCF. In certain aspects, the cell spacers 504 may comprise a fire retardant. The cell spacers 504 may be fabricated from, for example, a compliant material, such as silicone foam rubber, a fine-celled, irradiation cross-linked, polyolefin foam (e.g., Volara™ EO foam), polyurethane foam (e.g., Poron® Microcellular Urethanes foams), or another flexible/conforming material. For various optimization reasons, cell spacers 504 may be distributed between the battery cells 502; however, the cell spacers 504 may be otherwise arranged based on application requirements. In one aspect, the cell spacers 504 may be interleaved such that the cell-stack alternates between battery cells 502 and cell spacers 504. Each battery cell 502 may include a set of electrical tabs 506 (such as solder tabs, or other similar terminals) to electrically couple with one another or another device (e.g., a printed circuit board (PCB) 520).

With reference to FIG. 5b, sixteen (16) 2p pouch cell assemblies 518 may be stacked to define a cell-stack and secured to a PCB 520. Specifically, 32 battery cells 502 may be interleaved with 32 cell spacers 504. The electrical tabs 506 may pass through the PCB 520 and may be soldered directly to the PCB 520 (e.g., a rigid PCB). Depending on the nominal voltage of each battery cell 502, the battery cells 502 may be electrically arranged and connected in a series configuration, in a parallel configuration, or a combination thereof to achieve a desired nominal voltage and/or power for the battery pack 212.

One or more end-plates 512 (e.g., a shim or other stiffening section) may be provided at one or both ends of the cell-stack. The cell-stack and end-plate(s) 512 may then be inserted into a battery enclosure 516. The battery enclosure 516 may be, for example, a rigid Kevlar pressure enclosure configured to maintain a predetermined pressure on the cell-stack (and end-plate(s) 512). The battery enclosure 516 may be wrapped with a film 514, such as a pyrolytic graphite sheet (PGS) with polyester (PET) and pressure sensitive adhesive (PSA). As noted above, the battery pack assembly 202 employs plugs/connectors 410 to facilitate power/data interconnection. To that end, the PCB 520 further comprises data interface connectors 508 and power interface connectors 510 to allow for connection with, for example, the battery pack controller 406. The PCB 520 may further include circuitry to monitor and control the battery packs 212 within a battery pack assembly 202 via one or more sensors. The one or more sensors may include voltage sensors, amperage meters/sensors, temperature sensors, accelerometers, etc. As illustrated in FIGS. 5b and 5c, the lithium battery cells 502 are packaged in a battery enclosure 516, which may be fabricated as a composite structure; through other materials are contemplated, including plastic polymers and metals/metal alloys. FIG. 5c illustrates a fully assembled battery pack 212.

As noted above, lithium battery cells 502, such as lithium-polymer pouch cells, experience a performance and cycle-life increase when a pressure is applied normal to the battery cell's 502 thickness. In the example of lithium-polymer batteries, the pouch battery cells 502 experience performance benefit when pressure is applied perpendicularly to the battery cell's 502 internal layers. Ideally, this pressure should remain constant as the battery cells 502 swell cyclically. One solution may be to rely on the distributed cell spacers 504, where the lithium battery cells 502 may be preloaded to a desired pressure and inserted into the battery enclosure 516. Example methods of pressure application include, without limitation, pre-compression of a cell-stack with an integrated compliant material or device, post-compression of cell-stack using mechanical methods, etc. Standard metallic or plastic structural methods to withstand the necessary applied load over time, however, can be excessively heavy for ultralight aircraft applications. Accordingly, it is desirable to achieve a required cell compression at a low cost and weight.

Figure 6:
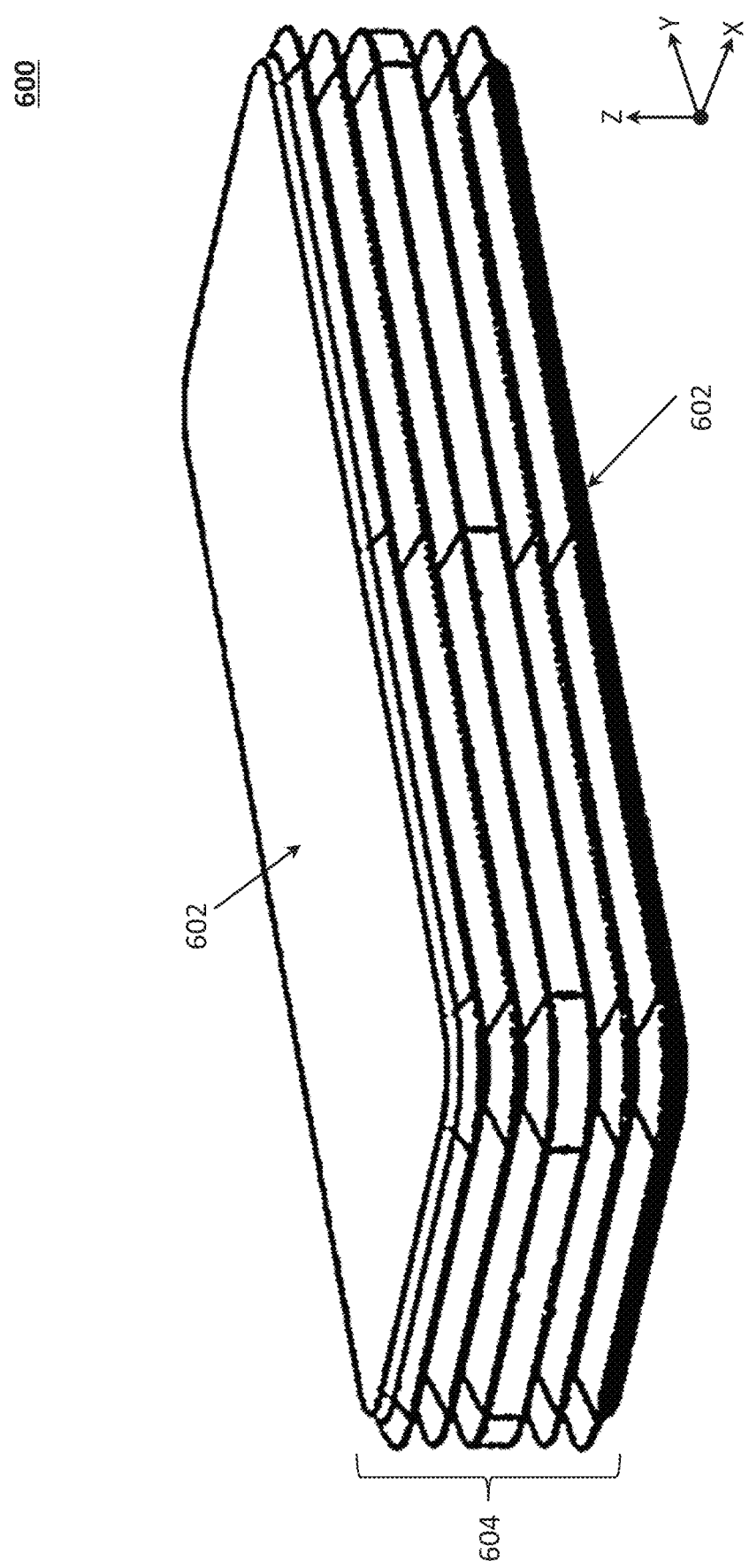
FIG. 6 illustrates an example pressurized bellows.

The distributed cell spacers 504 provide a constant pressure on the cell-stack to achieve a desired thickness/compression; however, a pressurized bellows 600 may be implemented to allow for a more constant pressure over a larger displacement. FIG. 6 illustrates an example pressurized bellows 600. The pressurized bellows 600 may be implemented in lieu of the cell spacers 504, or in addition to the cell spacers 504. As can be appreciated, the cell spacers 504 introduce weight to the cell-stack and increase manufacturing costs (e.g., material costs). As the pressurized bellows 600 can be used to regulate pressure, the cell spacers 504 may be omitted, thereby reducing weight and cost.

As illustrated, the pressurized bellows 600 generally comprises two flat (planar) ends 602 joined to one another along their perimeters via one or more sidewalls 604. As illustrated, the one or more sidewalls 604 are substantially perpendicular to each of the two flat ends 602. To permit greater expansion along the Z-axis, the sidewall 604 may be fabricated using a pleated material (as illustrated) and/or an elastic material. The pressurized bellows 600 may be fabricated from, for example, a plastic polymer, such as polyester, polyethylene, polypropylene, polystyrene, vinyl (e.g., polyvinyl chloride (PVC)), nylon, rubber, etc. Depending on the application, portions of the pressurized bellows 600 may be rigid. For example, the flat ends 602 of a pressurized bellows 600 may incorporate rigid plates to more effectively (e.g., evenly) apply an area of pressure on a soft material, effectively functioning as an end-plate.

In certain aspects, the pressurized bellows 600 may be printed through one or more additive manufacturing technique; also referred to as three-dimensional (3D) printing. Additive manufacturing techniques can be beneficial because they provide the ability to rapidly produce and iterate printed thermoplastic material components at reduced cost and time in comparison to other techniques. Additive manufacturing also allows the creation of complex shapes and features that can be difficult to achieve with composite manufacturing methods.

The pressurized bellows 600, or another sealed container, may house/contain a volatile mixture (liquid/gas mixture). For example, a volatile liquid that vaporizes to a vapor and condenses to a liquid as a function of pressure imparted on the pressurized bellows 600 by the cell-stack. Indeed, a volatile mixture maintains a constant vapor pressure at a given temperature. Volatility of a mixture, which is directly related to a substance's vapor pressure, can be quantified by the tendency of a substance to vaporize. For example, at a given temperature, a substance with higher vapor pressure vaporizes more readily than a substance with a lower vapor pressure. As the container object (here, the cell-stack) changes in volume during use, the vapor in the pressurized bellows 600 evaporates or condenses as a result of its chemistry to maintain a constant vapor pressure within the pressurized bellows 600. This effect enables the pressurized bellows 600 to provide a constant applied pressure over a range of compression distances. In other words, a volatile mixture wants to maintain a constant vapor pressure at a given temperature. If a sealed container (e.g., the pressurized bellows 600) filled with ideal gas is compressed (i.e. volume reduction), the pressure of the gas inside increases; however, if the sealed container is filled with a volatile mixture, the mixture will evaporate or condense as a result of its chemistry in order to maintain a specific vapor pressure (at a given constant temperature).

Figure 7A:
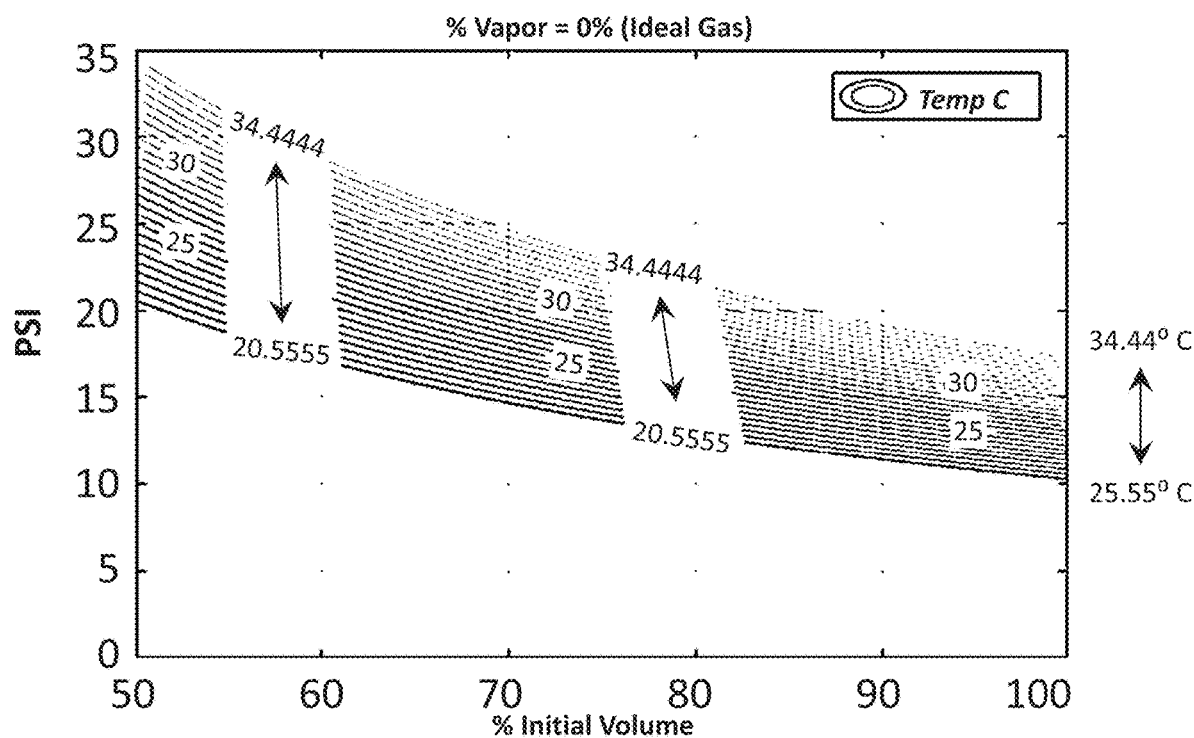
FIG. 7a illustrates a graph of initial volume vis-à-vis pressure for a gas mixture at 0% vapor (ideal gas) at various temperatures.
Figure 7B:
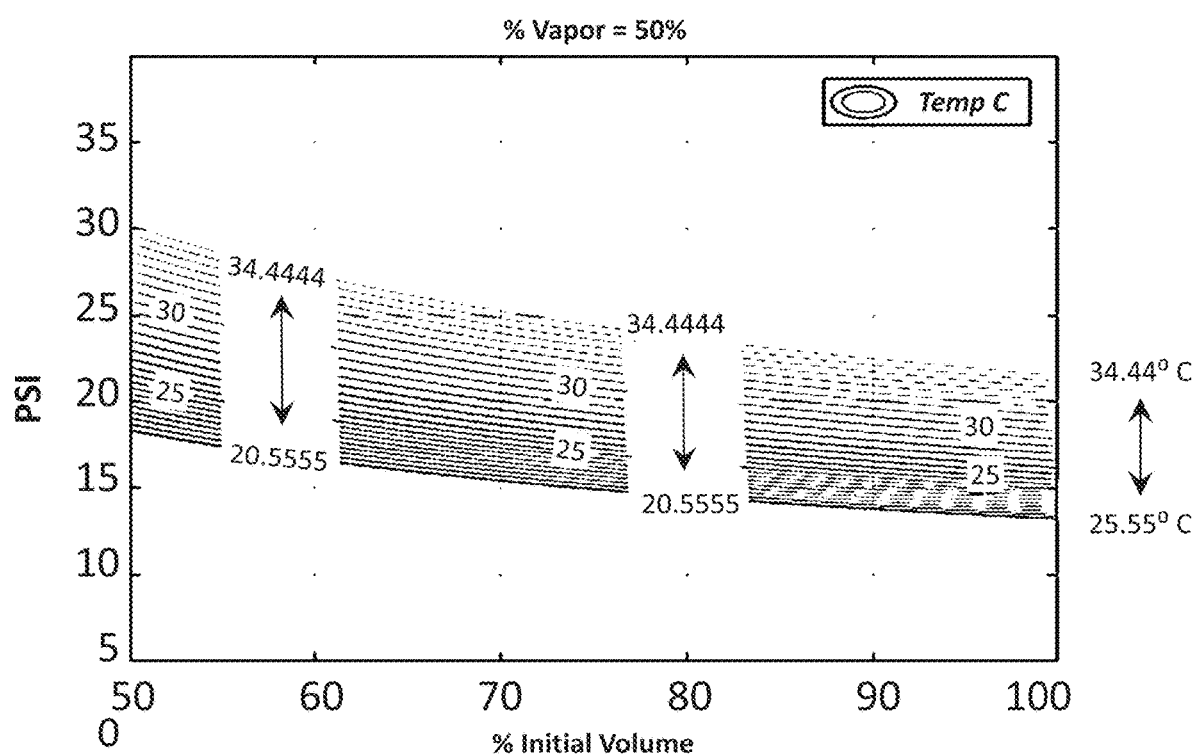
FIG. 7b illustrates a graph of initial volume vis-à-vis pressure for a gas mixture at 50% vapor at various temperatures.
Figure 7C:
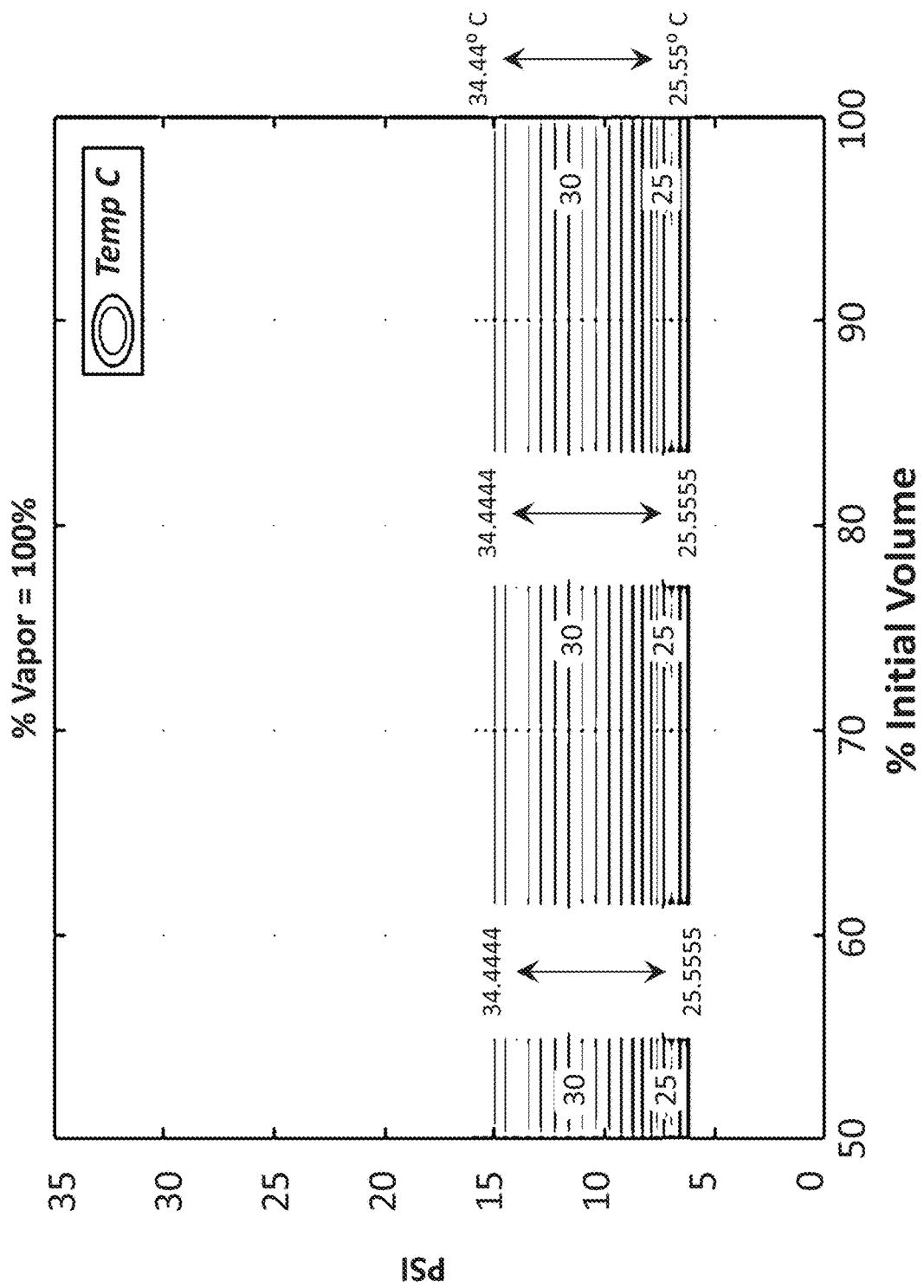
FIG. 7c illustrates a graph of initial volume vis-à-vis pressure for a gas mixture at 100% vapor at various temperatures.

As illustrated in FIG. 7a, at 0% volatile liquid, the vapor behaves according to the ideal gas law (i.e., $PV=n^{RT}$) with regards to temperature, pressure, and volume for a given mass; however, as illustrated in FIG. 7b, mixing 50% volatile liquid with an ideal gas begins to level the pressure vs. compression curves (50% volatile liquid). As illustrated in FIG. 7c, an ideal volatile liquid will maintain vapor pressure as volume changes; assuming a constant temperature during the mixed-phase regime (both liquid and vapor present). As illustrated, curves are provided for a range of temperatures from about 25.55° C. to 34.44° C. The illustrated example pressure properties of an ideal volatile liquid are provided for the same representative volatile liquid; specifically, FIGS. 7a through 7c represent the properties of diethyl ether and assume a sufficient liquid level for the volatile phase change. Other suitable types of volatile liquid include, inter alia, ethoxyethane, ethanol, pentane, and butyl acetate. Suitable non-flammable types of volatile liquid include, inter alia, sevoflurane, trichloroethylene, tetrachloromethane, desflurane, and tetrachloroethylene.

As can be gleaned from the graphs, a pressurized bellows 600 filled with an appropriate ratio of a volatile liquid is well-suited for near-constant temperature applications; thereby making it suitable in temperature-controlled applications to provide a tunable, near-constant, passively applied pressure over a relatively large displacement on an item that swells. Harnessing this effect via the pressurized bellows 600, or another sealed container, creates a passively applied constant pressure over a range of sealed container compression. Indeed, a volatile liquid may be used to provide a near-constant pressure over a range of displacements without the need for an external reservoir. When introduced to the battery enclosure 516 of a battery pack 212 as part of the lithium battery cell-stack, the pressurized bellows 600 improves capacity and life expectancy of the battery pack 212. Therefore, compared to the battery pack 212 of FIGS. 5a through 5c that illustrate use of cell spacers 504, the pressurized bellows 600 uses a volatile vapor/liquid to allow for a more constant pressure over a larger displacement. Indeed, an advantage of the pressurized bellows 600 is that it can achieve a constant pressure/force over a greater displacement range.

The pressurized bellows 600 may be tuned using one or more predetermined volatile liquids to create a passively pressurized bellows (or bladder) using a tuned mixture of volatile liquid and gas. The mixture may be tuned by adding the appropriate amount of volatile liquid via vapor pressure. In an application where the temperature remains approximately constant, the passive pressurization properties of the device can be tuned by a combination of the initial pressure of a volatile vapor, the mass-fraction of volatile to non-volatile component, and the structure of a sealed, flexible container, such as a bellows, bladder, piston, etc. The volatile liquid and its partial pressure may be selected for expected operating temperatures and assembly pressurization needs. The pressurized bellows 600 may then be partially filled and sealed with the appropriate volatile liquid.

With reference to FIGS. 8a and 8b, an example battery pack 212 is illustrated with a pressurized bellows 600 positioned within the battery enclosure 516. In one aspect, the pressurized bellows 600 may be introduced/inserted as part of the lithium battery cell-stack. For example and as illustrated, the pressurized bellows 600 may be positioned between the lithium battery cell-stack (or an end-plate 804 thereof) and an inner surface of the battery enclosure 516 to impart a constant pressure on the cell-stack.

Figure 8C:
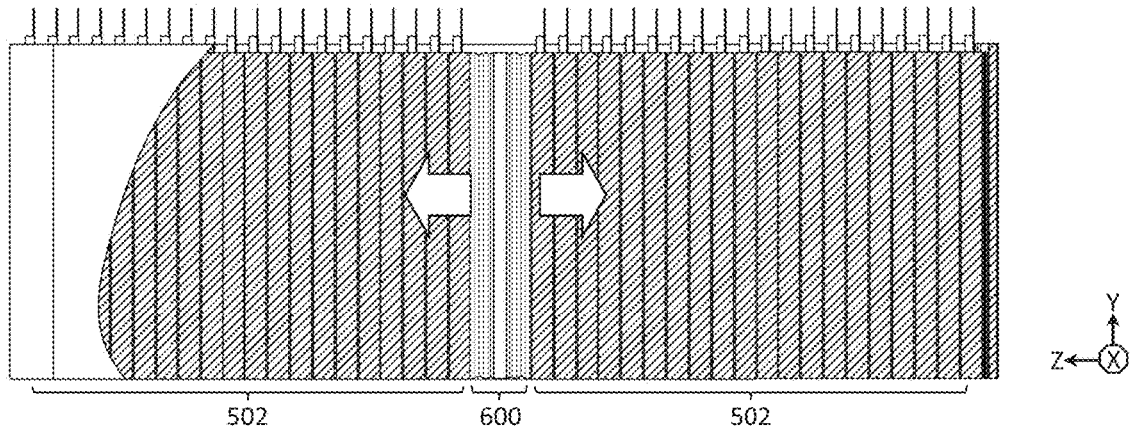
FIGS. 8c through 8e illustrate additional example battery pack having one or more pressurized bellows within the enclosure.
Figure 8D:
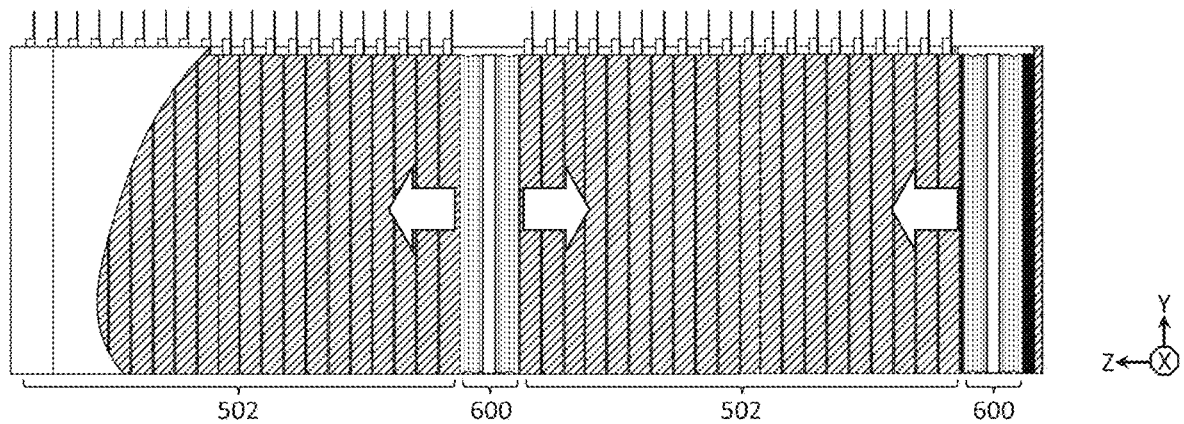
Figure 8E:
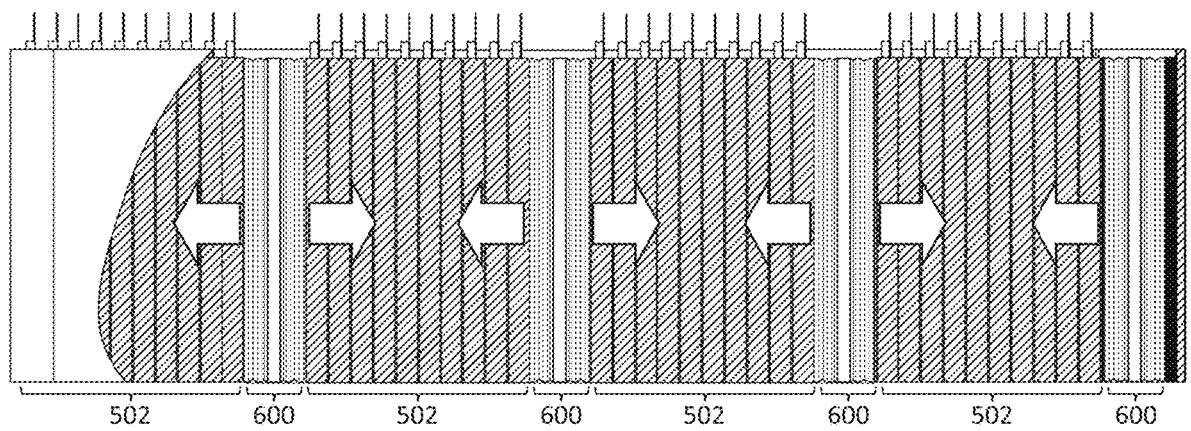

With reference to FIGS. 8c through 8e, one or more pressurized bellows 600 may be positioned within the cell-stack (e.g., between two adjacent battery cells 502 of the cell-stack). An advantage of positioning the one or more pressurized bellows 600 within the cell-stack is that the pressure may be distributed (or targeted) within the cell-stack. As illustrated in FIG. 8c, for example, it may be advantageous to position a pressurized bellows 600 at the center of the cell-stack, such that the force from the pressurized bellows 600 is directed outward towards the ends of the battery enclosure 516 (as indicated by the arrows). As illustrated, an even number of battery cells 502 may be positioned on each side of the pressurized bellows 600. While twenty battery cells 502 are illustrated on each side, the number of battery cells 502 may be increased or decreased depending on the pressure needs and total number of battery cells 502 in the cell-stack. In another example, as illustrated in FIG. 8d, a first pressurized bellows 600 may be positioned at the center of the cell-stack (as described in connection with FIG. 8c) and a second pressurized bellows 600 may be positioned at the end of the cell-stack, such that the force from the second pressurized bellows 600 is directed towards the cell-stack (as indicated by the arrow). In yet another example, as illustrated in FIG. 8e, a plurality of pressurized bellows 600 may be inserted in the cell-stack. As illustrated, for example, a pressurized bellows 600 may be positioned every ten battery cells 502 (e.g., evenly distributed) in a cell-stack having 40 battery cells 502 and three pressurized bellows 600 positioned in the cell-stack. As illustrated, a fourth pressurized bellows 600 may be positioned at the end of the cell-stack. Again, while ten battery cells 502 between each set of adjacent pressurized bellows 600, the number of battery cells 502 may be increased or decreased depending on the pressure needs and total number of cells in the cell-stack.

While the battery packs 212 of FIGS. 8a through 8e omit the cell spacers 504 in favor of the pressurized bellows 600 to reduce weight/material usage, in certain aspects, the battery pack 212 may employ both cell spacers 504 and a pressurized bellows 600. The pressurized bellows 600 may be sized and shaped to substantially match the interior dimensions of the battery enclosure's 516 cross-section, which may be dictated by the length (y-axis) and width (x-axis) of the battery cell(s) 502. In operation, the pressurized bellows 600 widens to generate a bellows force along the Z-axis (as indicated by the arrow) by pushing against the cell-stack (e.g., via an end-plate 804) and the inner wall 802 of the battery enclosure 516.

While the pressurized bellows 600 is generally illustrated as a flexible bellows with pleated sidewalls 604, the underlying principles may be applied to virtually any sealed (or sealable) container with a displaceable surface as desired for a particular application. This sealed container may include, inter alia, the fully-sealed "stand-alone" container of FIGS. 8a and 8b, a sealed container connected to external vapor source, or a sealed container connected to pressure regulator. The sealed container can also be tuned with multiple volatile substances, tuned with intent to fully liquefy or vaporize the volatile substance, and/or sized or shaped as the application requires. Rather than applying pressure outward, the sealed container may be configured as a hollow geometric shape (e.g., a tubular shape) configured to squeeze an object when pressured.

With reference to FIGS. 9a and 9b, the principles described with regard to the pressurized bellows 600 may be accomplished using a sealed piston device 900 having fully-rigid container 902. As illustrated, a fully-rigid container 902 may be affixed to the exterior of the battery enclosure 516 (or another solid surface) and configured to translate/drive a driving plate 910 within the battery enclosure 516 via a drive rod 908 that passes through a wall of the battery enclosure 516. Specifically, the volatile liquid could be housed within the cavity 904 of the fully-rigid container 902 to provide a constant load on a drive rod 908 over a range of displacement. In operation, the volatile vapor mixture drives the piston head 906, which in turn laterally displaces (drives) the drive rod 908 toward the cell-stack. The drive rod 908 may be coupled directly to the cell-stack (e.g., via an end-plate 804) or via a driving plate 910, which may be secured to, or integral with, the drive rod 908.

Any patents, patent publications, or articles cited herein are hereby incorporated by reference in their entirety. It will be appreciated that the methods and systems described above are set forth by way of example and not of limitation. Numerous variations, additions, omissions, and other modifications will be apparent to one of ordinary skill in the art. Variations of the foregoing may include: alternate materials, thicknesses, ply count, and/or fiber direction to achieve design elasticity; variation in sleeve geometry and cross section; variation in stiffened geometry and cross section; and variation in sleeve alignment and parallelism. In addition, the order or presentation of method steps is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A battery pack comprising:
    a battery enclosure;
    a cell-stack having a plurality of battery cells, wherein:
        the cell-stack is positioned within the battery enclosure; and
        each battery cell comprises a first end comprising at least one terminal, an opposing second end, and a sidewall extending from the first end to the opposing second end; and
    a sealed container housing a volatile vapor, wherein the sealed container is positioned between sidewalls of two adjacent battery cells of the plurality of battery cells within the battery enclosure such that the sealed container extends along the sidewalls of the two adjacent battery cells between the first and second opposing ends of the two adjacent battery cells, and wherein the sealed container is configured to impart a force against the sidewalls of the two adjacent battery cells to compress the cell-stack.

2. The battery pack of claim 1, wherein the sealed container is a pressurized bellows.

3. The battery pack of claim 2, wherein the pressurized bellows comprises two flat ends and a bellows sidewall.

4. The battery pack of claim 3, wherein the bellows sidewall is pleated.

5. The battery pack of claim 1, wherein the sealed container is fabricated using a plastic polymer.

6. The battery pack of claim 1, wherein the battery enclosure is a composite structure.

7. The battery pack of claim 1, wherein the plurality of battery cells is interleaved with a plurality of cell spacers.

8. The battery pack of claim 1, wherein the cell-stack comprises a plurality of distributed cell spacers.

9. The battery pack of claim 8, wherein each of the plurality of distributed cell spacers is fabricated from a compliant material.

10. The battery pack of claim 1, wherein each of the plurality of battery cells is a lithium polymer pouch.

11. The battery pack of claim 10, wherein the plurality of battery cells are electrically coupled to one another to yield, in aggregate, a first nominal voltage.

12. The battery pack of claim 11, wherein the plurality of battery cells are electrically coupled to one another using a printed circuit board (PCB).

13. The battery pack of claim 11, wherein the battery pack is within a battery pack assembly comprising a battery pack controller configured to monitor each of the battery pack and a second battery pack.

14. The battery pack of claim 13, wherein the battery pack assembly is electrically coupled with a solar panel, wherein the solar panel is configured to charge the battery pack assembly.

15. The battery pack of claim 14, further comprising an aircraft, wherein the solar panel is coupled to a wing of the aircraft.

16. The battery pack of claim 1, wherein the volatile vapor comprises diethyl ether, ethoxyethane, ethanol, pentane, or butyl acetate.

17. The battery pack of claim 1, wherein the volatile vapor comprises sevoflurane, trichloroethylene, tetrachloromethane, desflurane, or tetrachloroethylene.

18. The battery pack of claim 7, wherein the sealed container replaces one or more of the plurality of cell spacers.

* * * * *